United States Patent
Svendsen

(10) Patent No.: US 9,195,679 B1
(45) Date of Patent: Nov. 24, 2015

(54) METHOD AND SYSTEM FOR THE CONTEXTUAL DISPLAY OF IMAGE TAGS IN A SOCIAL NETWORK

(75) Inventor: Hugh Blake Svendsen, Chapel Hill, NC (US)

(73) Assignee: Ikorongo Technology, LLC, Chapel Hill, NC (US)

( * ) Notice: Subject to any disclaimer, the term of this patent is extended or adjusted under 35 U.S.C. 154(b) by 333 days.

(21) Appl. No.: 13/572,618

(22) Filed: Aug. 11, 2012

Related U.S. Application Data

(60) Provisional application No. 61/522,322, filed on Aug. 11, 2011.

(51) Int. Cl.
  G06F 17/30 (2006.01)
  G06K 9/00 (2006.01)

(52) U.S. Cl.
  CPC ...... *G06F 17/30268* (2013.01); *G06K 9/00221* (2013.01)

(58) Field of Classification Search
  None
  See application file for complete search history.

(56) References Cited

U.S. PATENT DOCUMENTS

| | | | |
|---|---|---|---|
| 6,526,158 B1 | 2/2003 | Goldberg | |
| 6,591,068 B1 | 7/2003 | Dietz | |
| 6,606,398 B2 | 8/2003 | Cooper | |
| 6,745,186 B1 | 6/2004 | Testa et al. | |
| 6,819,783 B2 | 11/2004 | Goldberg et al. | |
| 7,028,253 B1 * | 4/2006 | Lieberman et al. | 715/232 |
| 7,068,309 B2 | 6/2006 | Toyama et al. | |
| 7,203,367 B2 | 4/2007 | Shniberg et al. | |
| 7,260,587 B2 | 8/2007 | Testa et al. | |
| 7,266,563 B2 | 9/2007 | Morris et al. | |
| 7,376,276 B2 | 5/2008 | Shniberg et al. | |
| 7,561,723 B2 | 7/2009 | Goldberg et al. | |
| 7,587,101 B1 | 9/2009 | Bourdev | |
| 7,684,651 B2 | 3/2010 | Tang et al. | |
| 7,739,304 B2 | 6/2010 | Naaman et al. | |
| 7,769,745 B2 | 8/2010 | Naaman et al. | |
| 7,783,085 B2 | 8/2010 | Perlmutter et al. | |

(Continued)

FOREIGN PATENT DOCUMENTS

| | | |
|---|---|---|
| WO | 2007115224 A2 | 10/2007 |
| WO | 2010085186 A1 | 7/2010 |
| WO | 2011018681 A1 | 2/2011 |

OTHER PUBLICATIONS

Lindstaedt, Stefanie, et al. "Recommending tags for pictures based on text, visual content and user context." Internet and Web Applications and Services, 2008. ICIW'08. Third International Conference on. IEEE, 2008.*

(Continued)

*Primary Examiner* — Scott B Christensen
*Assistant Examiner* — Sean Concannon

(57) ABSTRACT

Methods and systems for the contextual display of image tags in a social network are disclosed. According to an aspect, a method includes obtaining text for display with an image. The method also includes displaying the image in a first display area. Further, for a portion of the text, the method includes determining whether the portion is designated as a recommended tag or not. In response to determining that the portion is designated as the recommended tag, displaying the portion in a second display area and indicating that the portion is the recommended tag, and in response to determining that the portion is not designated as the recommended tag, displaying the portion in the second display area and indicating that the portion is not the recommended tag.

23 Claims, 21 Drawing Sheets

(56) References Cited

U.S. PATENT DOCUMENTS

| | | | |
|---|---|---|---|
| 7,916,894 B1 | 3/2011 | Dhillon et al. | |
| 7,933,972 B1 | 4/2011 | Issa et al. | |
| 7,945,653 B2 | 5/2011 | Zuckerberg et al. | |
| 7,953,690 B2 | 5/2011 | Luo et al. | |
| 7,961,986 B1 | 6/2011 | Jing et al. | |
| 8,014,572 B2 | 9/2011 | Xiao et al. | |
| 8,144,944 B2 | 3/2012 | Ishii | |
| 8,189,880 B2 | 5/2012 | Wen et al. | |
| 8,284,990 B2 | 10/2012 | Ma et al. | |
| 8,306,284 B2 | 11/2012 | Goldberg et al. | |
| 8,325,999 B2 | 12/2012 | Kapoor et al. | |
| 8,341,145 B2 | 12/2012 | Dodson et al. | |
| 8,358,811 B2 | 1/2013 | Adams et al. | |
| 8,379,939 B1 * | 2/2013 | Bourdev | G06K 9/00677 382/118 |
| 8,402,094 B2 | 3/2013 | Bosworth et al. | |
| 8,458,174 B1 * | 6/2013 | Duerig | 707/723 |
| 8,510,383 B2 | 8/2013 | Hurley et al. | |
| 8,612,533 B1 | 12/2013 | Harris et al. | |
| 8,731,819 B2 | 5/2014 | Dzubay et al. | |
| 2003/0063771 A1 | 4/2003 | Morris et al. | |
| 2003/0161499 A1 | 8/2003 | Svendsen et al. | |
| 2006/0048059 A1 | 3/2006 | Etkin | |
| 2006/0161867 A1 | 7/2006 | Drucker et al. | |
| 2006/0248573 A1 * | 11/2006 | Pannu et al. | 726/1 |
| 2006/0251338 A1 | 11/2006 | Gokturk et al. | |
| 2007/0118508 A1 | 5/2007 | Svendsen | |
| 2007/0118509 A1 | 5/2007 | Svendsen | |
| 2007/0118525 A1 | 5/2007 | Svendsen | |
| 2007/0234215 A1 * | 10/2007 | Graham et al. | 715/723 |
| 2007/0250496 A1 | 10/2007 | Halliday et al. | |
| 2007/0288426 A1 * | 12/2007 | Schachter | G06F 17/30884 |
| 2008/0062283 A1 | 3/2008 | Matsushita et al. | |
| 2008/0086450 A1 * | 4/2008 | Bittenson | G06F 17/30014 |
| 2008/0091549 A1 * | 4/2008 | Chang et al. | 705/26 |
| 2008/0140679 A1 * | 6/2008 | Deyo et al. | 707/100 |
| 2008/0143762 A1 | 6/2008 | Obrea | |
| 2008/0195657 A1 * | 8/2008 | Naaman et al. | 707/104.1 |
| 2008/0195962 A1 | 8/2008 | Lin et al. | |
| 2008/0279419 A1 | 11/2008 | Kluesing et al. | |
| 2008/0298766 A1 | 12/2008 | Wen et al. | |
| 2008/0310688 A1 | 12/2008 | Goldberg | |
| 2009/0144392 A1 | 6/2009 | Wang et al. | |
| 2009/0164516 A1 * | 6/2009 | Svendsen | G06F 17/30041 |
| 2009/0216806 A1 | 8/2009 | Feuerstein et al. | |
| 2009/0234815 A1 | 9/2009 | Boerries et al. | |
| 2009/0248610 A1 | 10/2009 | Sigurbjornsson et al. | |
| 2009/0271247 A1 | 10/2009 | Karelin et al. | |
| 2009/0292549 A1 | 11/2009 | Ma et al. | |
| 2009/0319559 A1 | 12/2009 | Westerfeld et al. | |
| 2010/0036875 A1 | 2/2010 | Miezianko et al. | |
| 2010/0063961 A1 | 3/2010 | Guiheneuf et al. | |
| 2010/0095326 A1 | 4/2010 | Robertson, III | |
| 2010/0145967 A1 * | 6/2010 | Fu | G06F 17/30905 707/758 |
| 2010/0153848 A1 | 6/2010 | Saha | |
| 2010/0180218 A1 * | 7/2010 | Boston et al. | 715/759 |
| 2010/0185642 A1 | 7/2010 | Higgins et al. | |
| 2010/0191728 A1 | 7/2010 | Reilly et al. | |
| 2010/0287592 A1 | 11/2010 | Patten et al. | |
| 2010/0293195 A1 | 11/2010 | Houghton | |
| 2010/0310135 A1 | 12/2010 | Nagaoka et al. | |
| 2011/0016150 A1 * | 1/2011 | Engstrom et al. | 707/778 |
| 2011/0022529 A1 | 1/2011 | Barsoba et al. | |
| 2011/0035350 A1 | 2/2011 | Zwol et al. | |
| 2011/0038512 A1 | 2/2011 | Petrou et al. | |
| 2011/0087734 A1 | 4/2011 | Parsons et al. | |
| 2011/0107369 A1 | 5/2011 | O'Brien et al. | |
| 2011/0137989 A1 | 6/2011 | Kiciman et al. | |
| 2011/0143811 A1 * | 6/2011 | Rodriguez | G06K 9/00986 455/556.1 |
| 2011/0145275 A1 | 6/2011 | Stewart | |
| 2011/0145719 A1 * | 6/2011 | Chen et al. | 715/739 |
| 2011/0150340 A1 | 6/2011 | Gotoh et al. | |
| 2011/0173141 A1 | 7/2011 | Campbell et al. | |
| 2011/0182482 A1 | 7/2011 | Winters et al. | |
| 2011/0188742 A1 | 8/2011 | Yu et al. | |
| 2011/0196923 A1 | 8/2011 | Marcucci et al. | |
| 2011/0202531 A1 | 8/2011 | Zuckerberg et al. | |
| 2011/0202822 A1 | 8/2011 | Zuckerberg et al. | |
| 2011/0211736 A1 | 9/2011 | Krupka et al. | |
| 2011/0211737 A1 | 9/2011 | Krupka et al. | |
| 2011/0234613 A1 | 9/2011 | Hanson et al. | |
| 2012/0076367 A1 | 3/2012 | Tseng | |
| 2012/0158753 A1 | 6/2012 | He et al. | |
| 2012/0166533 A1 | 6/2012 | Rubinstein et al. | |
| 2012/0250950 A1 | 10/2012 | Papakipos et al. | |
| 2012/0250951 A1 * | 10/2012 | Chen | 382/118 |
| 2012/0271790 A1 | 10/2012 | Lappas et al. | |
| 2012/0275666 A1 | 11/2012 | Gao | |
| 2012/0278387 A1 * | 11/2012 | Garcia et al. | 709/204 |
| 2012/0278395 A1 | 11/2012 | Garcia | |
| 2012/0281911 A1 * | 11/2012 | Fung | 382/165 |
| 2012/0310968 A1 | 12/2012 | Tseng | |
| 2013/0124508 A1 | 5/2013 | Paris et al. | |
| 2013/0275505 A1 | 10/2013 | Gauglitz et al. | |
| 2014/0214843 A1 | 7/2014 | Arvig | |

OTHER PUBLICATIONS

Duckworth, Jianmei F. Office Action for U.S. Appl. No. 13/572,619, dated Jan. 16, 2015, 21 pages.

Duckworth, Jianmei F. Office Action for U.S. Appl. No. 13/572,619, dated Aug. 28, 2015, 27 pages.

* cited by examiner

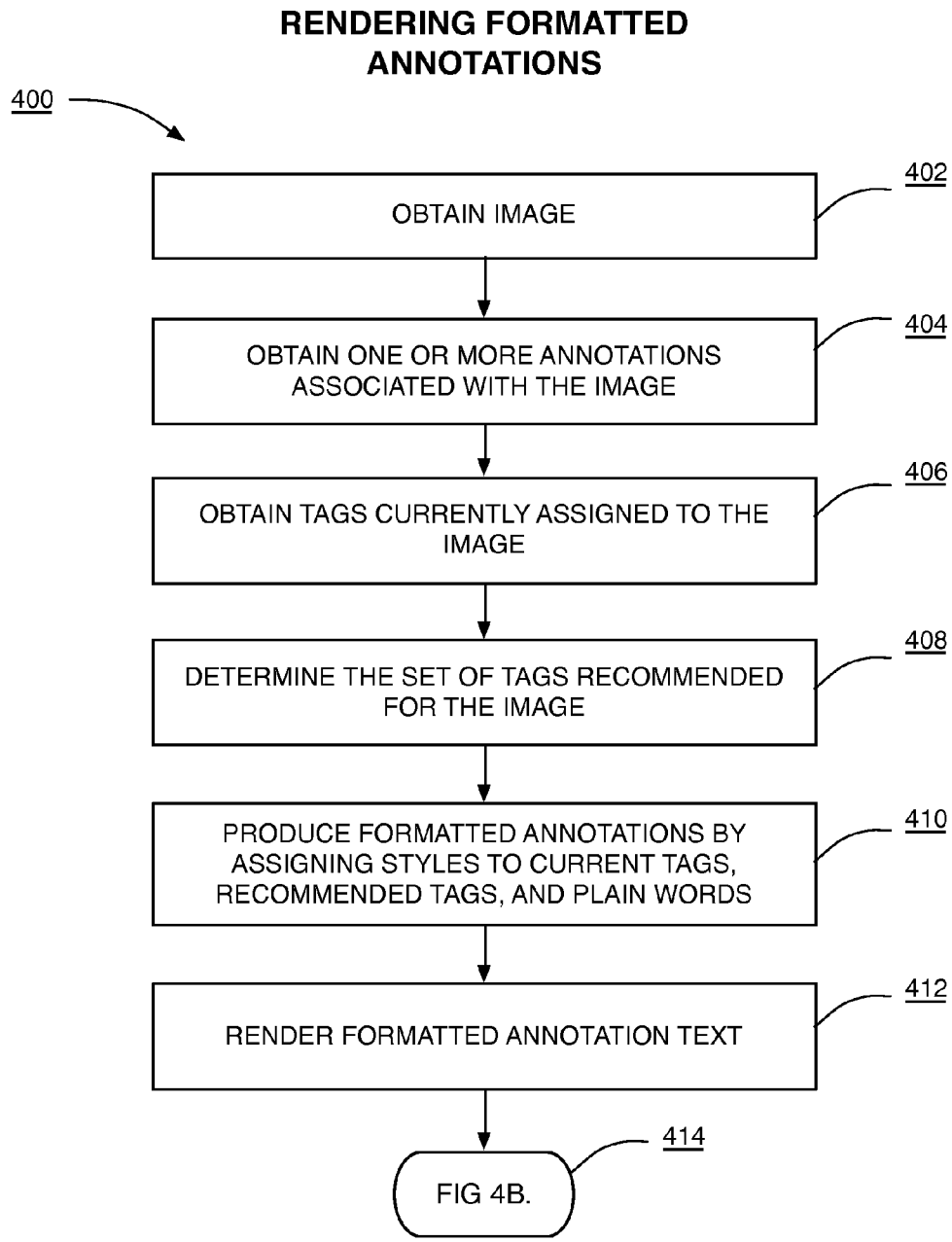

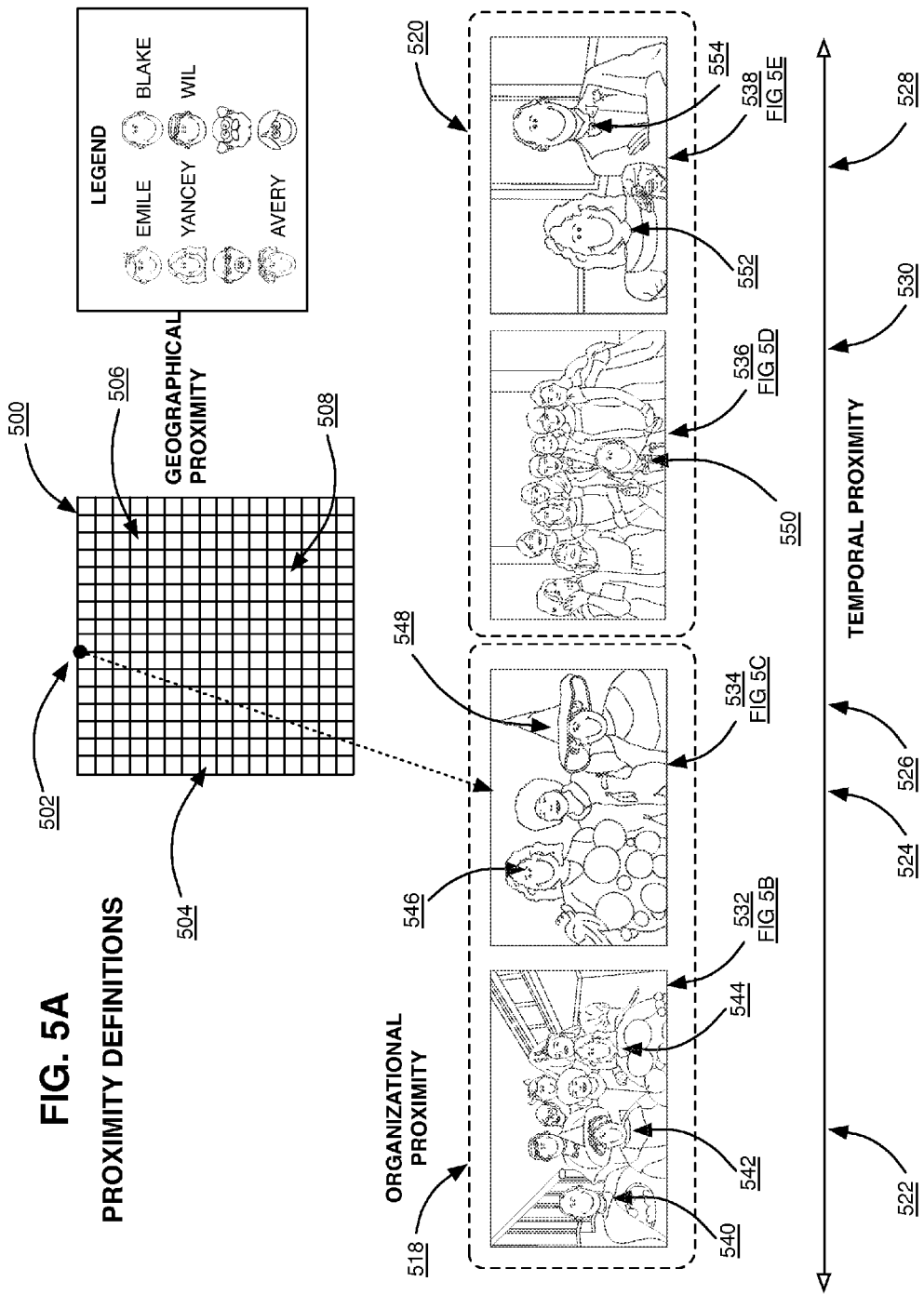

METHOD AND SYSTEM FOR THE CONTEXTUAL DISPLAY OF IMAGE TAGS IN A SOCIAL NETWORK

CROSS REFERENCE TO RELATED APPLICATION

The present application claims priority from U.S. Provisional Application No. 61/522,322 filed on Aug. 11, 2011, the disclosure of which is hereby incorporated herein by reference in its entirety. This application is related to U.S. patent application Ser. No. 13/572,619, entitled METHOD AND SYSTEM FOR IMAGE TAGGING IN A SOCIAL NETWORK which was filed Aug. 11, 2012 and is commonly owned and assigned and are hereby incorporated herein by reference in its entirety.

FIELD OF THE DISCLOSURE

The present disclosure relates to the tagging of images. More particularly, the present disclosure relates to image tagging in a social network.

BACKGROUND OF THE DISCLOSURE

Capturing and uploading digital images to photosharing and social networking websites has become commonplace in today's society. Due to advances in ease of use and declines in pricing, digital imaging capabilities have never been more accessible. Indeed, one popular social networking site with imaging capabilities, FACEBOOK®, records in excess of 200 million image uploads per day. With this proliferation of digital imaging content, new techniques are needed to facilitate better tagging on these images.

SUMMARY OF THE DISCLOSURE

Those skilled in the art will appreciate the scope of the present disclosure and realize additional aspects thereof after reading the following detailed description of the various aspects and implementations in association with the accompanying drawing figures.

With the proliferation of high quality low cost digital camera technology, taking digital images has become an immensely popular past time for an ever-broadening segment of society. Unfortunately, solutions for organizing and storing images have not kept pace and continue to be a labor intensive and time consuming activity. Accordingly, improved mechanisms are still desired to ease the burden of tagging images in such a way that search and retrieval mechanisms can work more efficiently and produce more accurate results.

According to an aspect, a method includes selecting a subject face within an image. The method also includes obtaining information associated with the subject face and the image. Further, the method includes determining one or more candidate tags based on the information. The method also includes selecting a recommend tag from among the one or more candidate tags.

According to another aspect, a method includes obtaining annotations for an image. The method also includes generating one or more candidate tags based on the annotations and excluding commonly occurring words. Further, the method includes determining candidate tags based on a social distance between respective contributors of the annotations and an image owner of the image. The method also includes refining candidate tags based on an occurrence of a respective annotation contributor as a subject face in the image. Further, the method includes selecting a recommended tag from among the candidate tags.

According to another aspect, a method includes obtaining text for display with an image. Further, the method includes displaying the image in a first display area. The method includes for a portion of the text: determining whether the portion is designated as a recommended tag or not; displaying the portion in a second display area and indicating that the portion is the recommended tag in response to determining that the portion is designated as the recommended tag; and displaying the portion in the second display area and indicating that the portion is not the recommended tag in response to determining that the portion is not designated as the recommended tag.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 4A illustrates a flowchart that shows an example method 400 of rendering formatted annotations and refreshing the formatted annotations in response to user input;

Figure 5B:
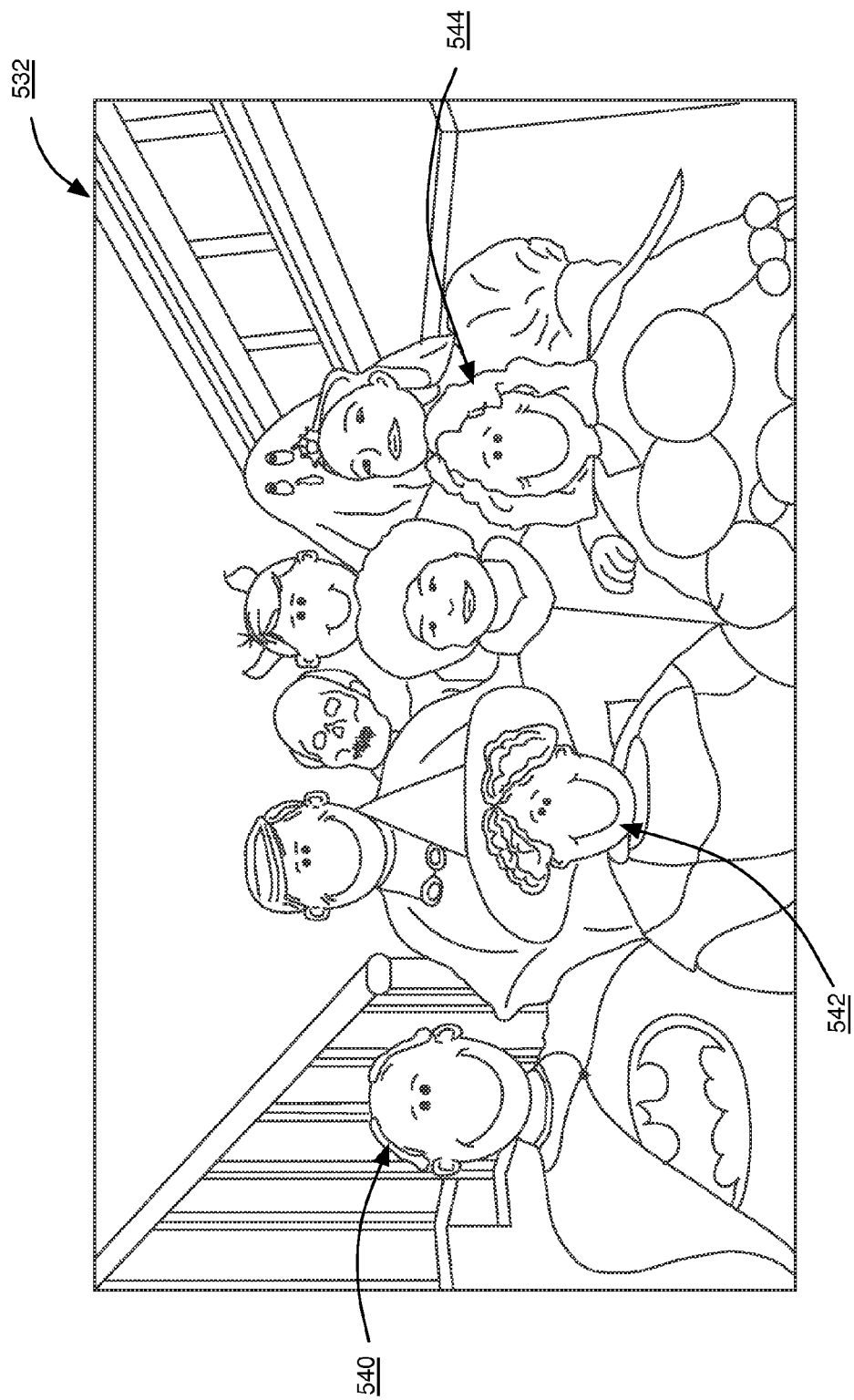
FIG. 5A is a graphical depiction of a set of images and proximity information that can be derived from the images based on time, location, organization, and composition according to an aspect of the present disclosure.
Figure 5C:
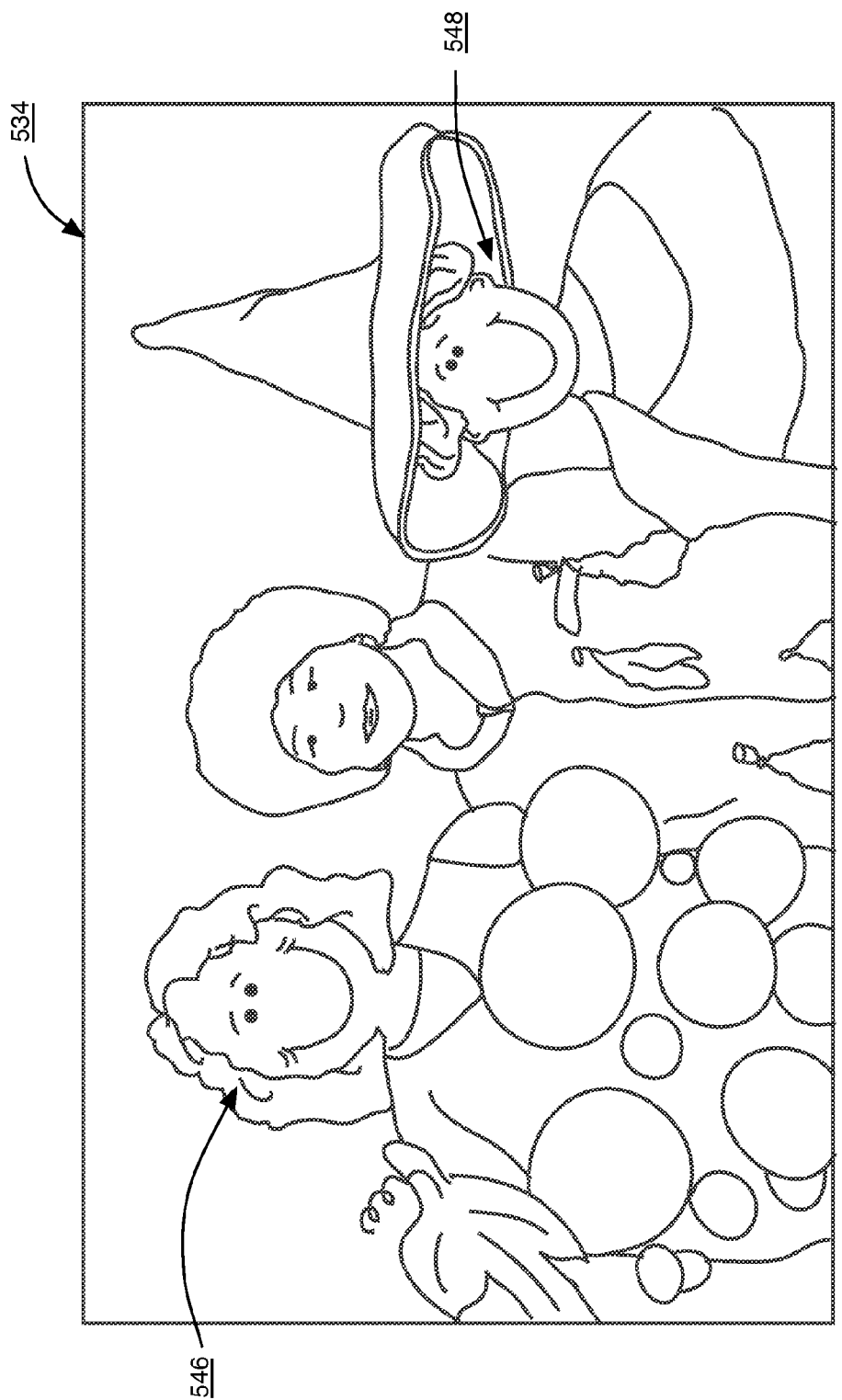
Figure 5D:
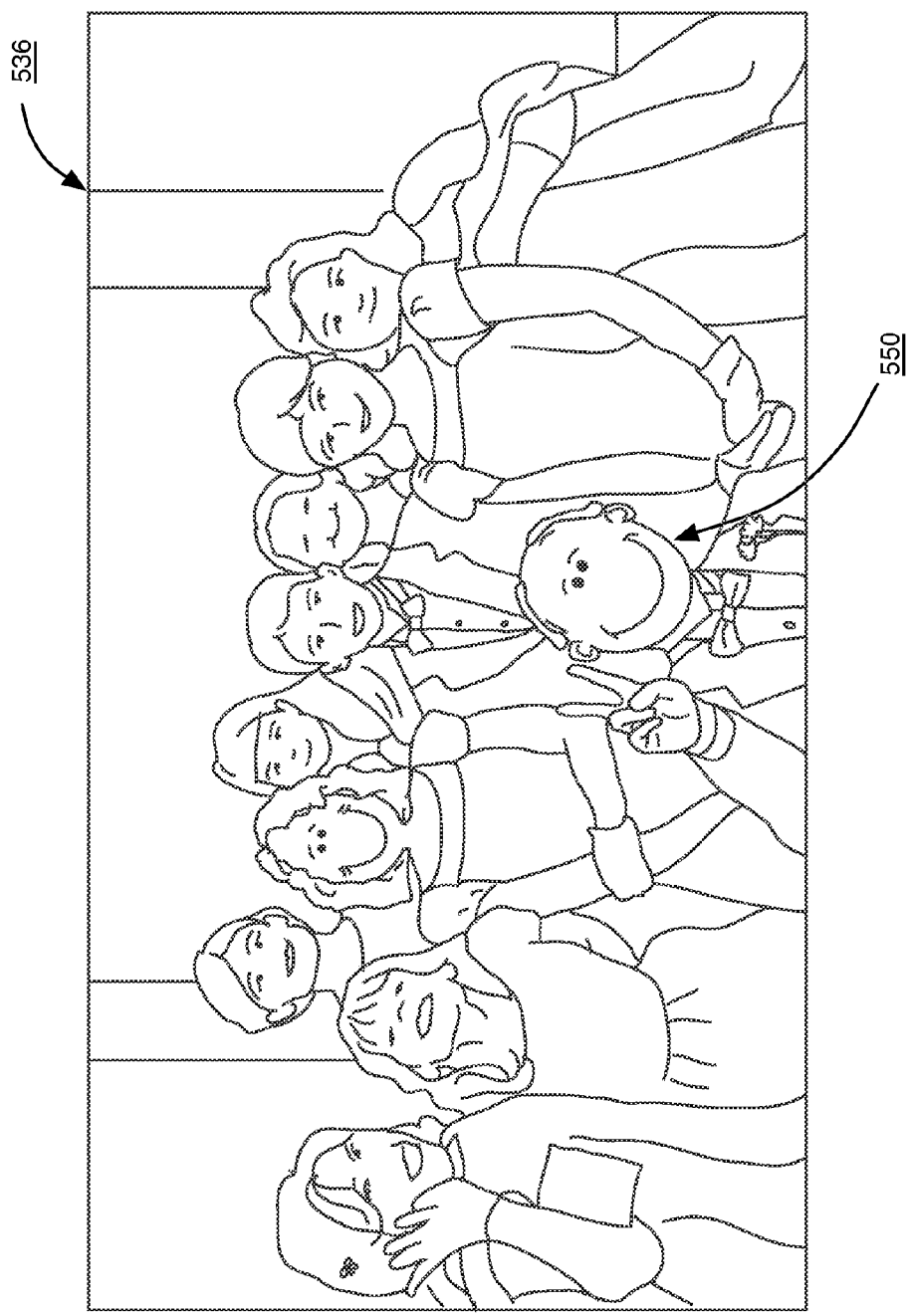
Figure 5E:
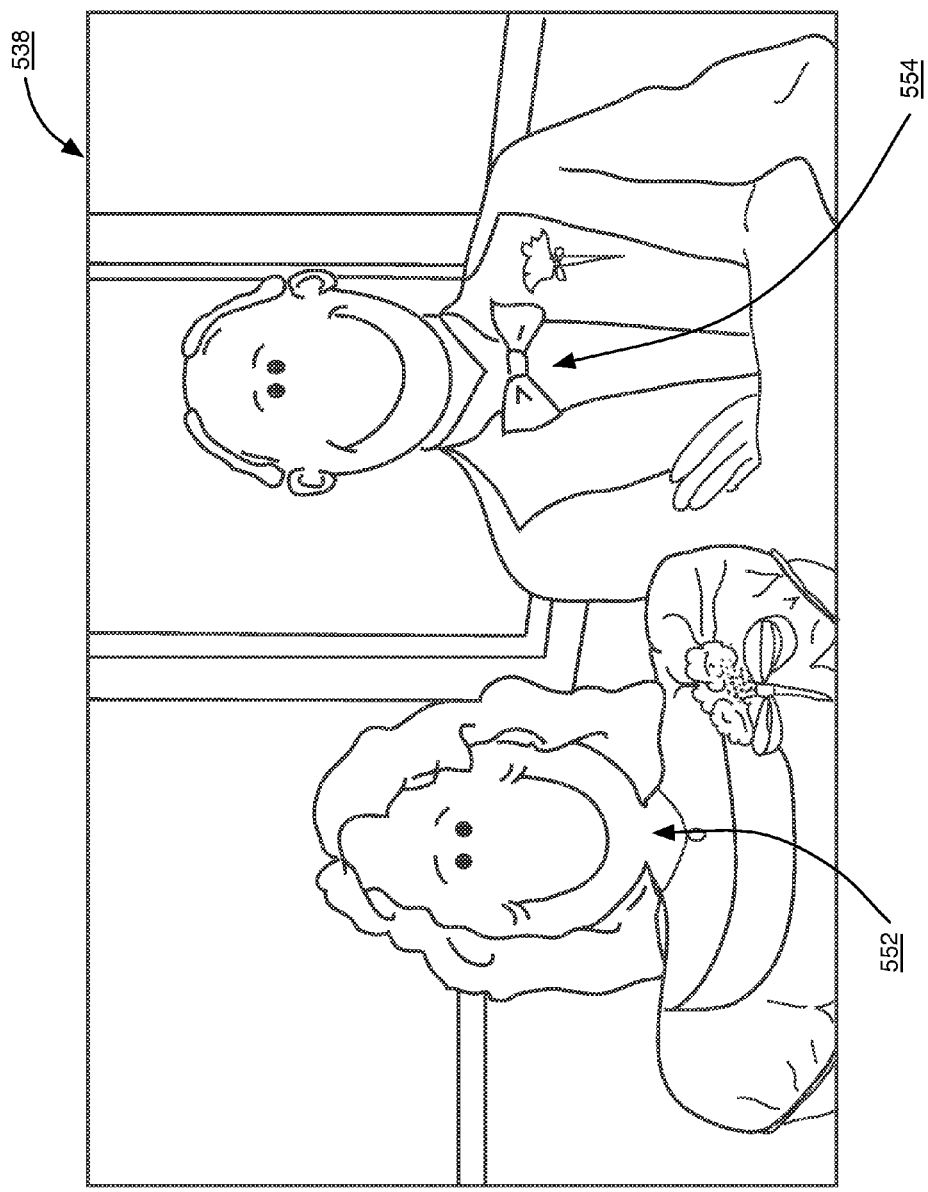
Figure 6:
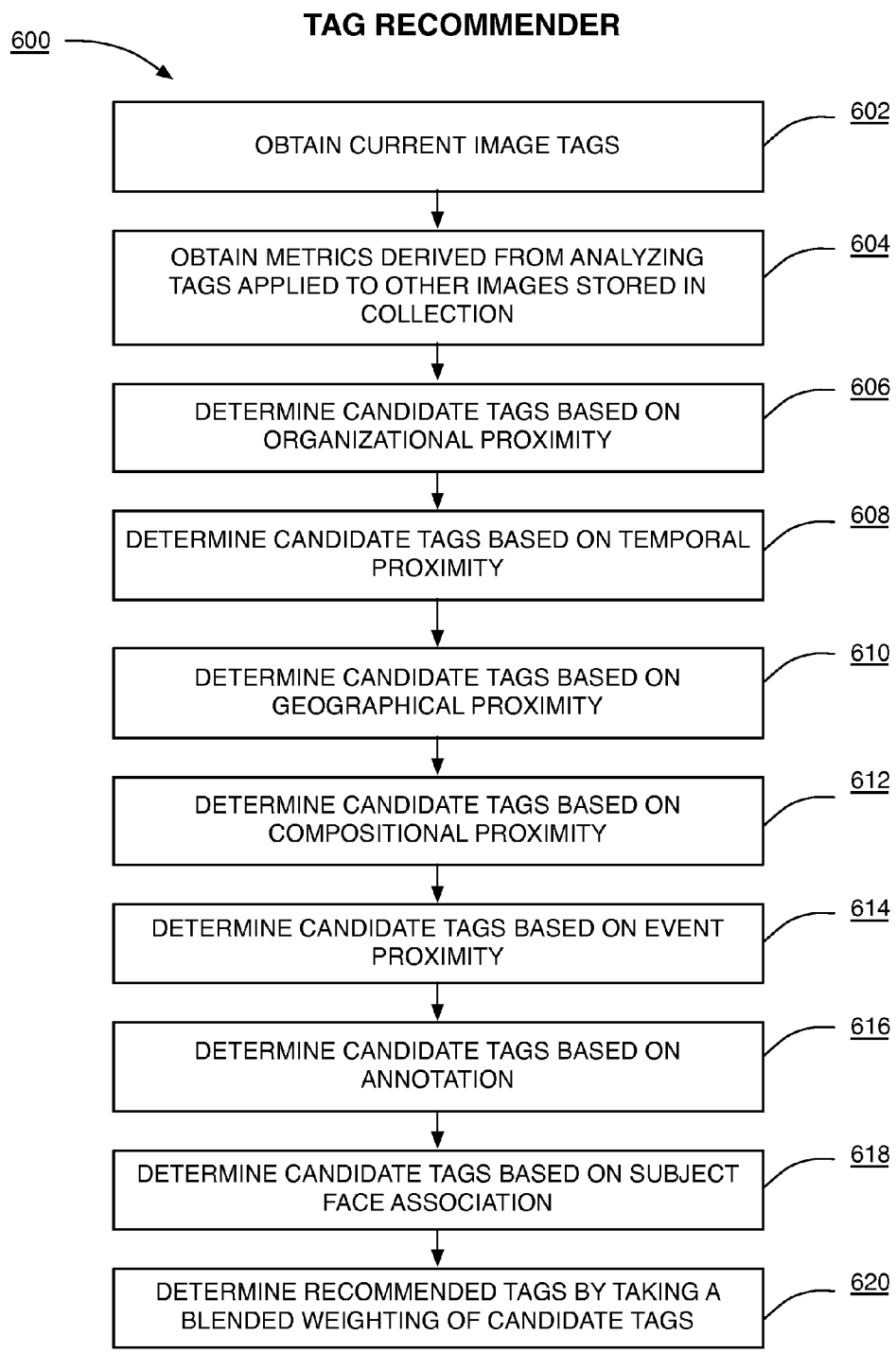
Figure 7:
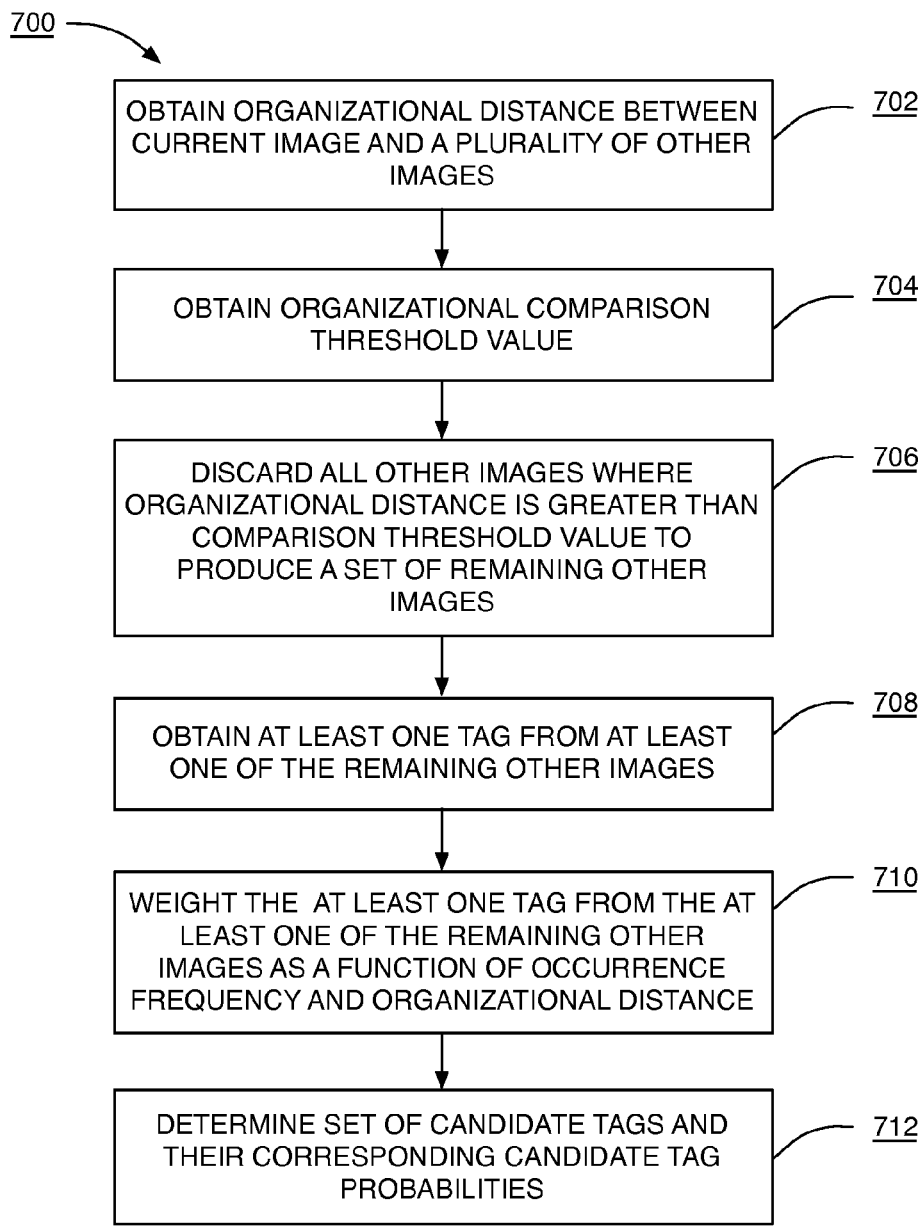
Figure 8:
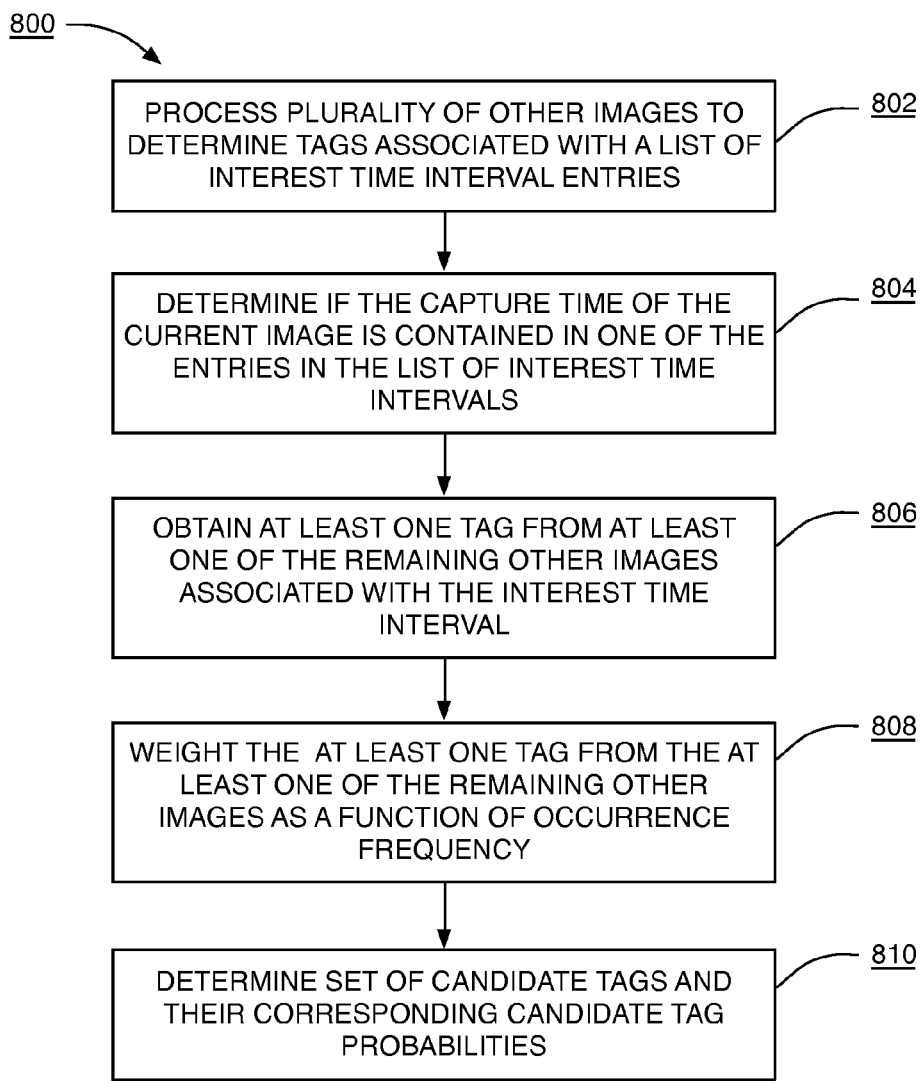
Figure 9:
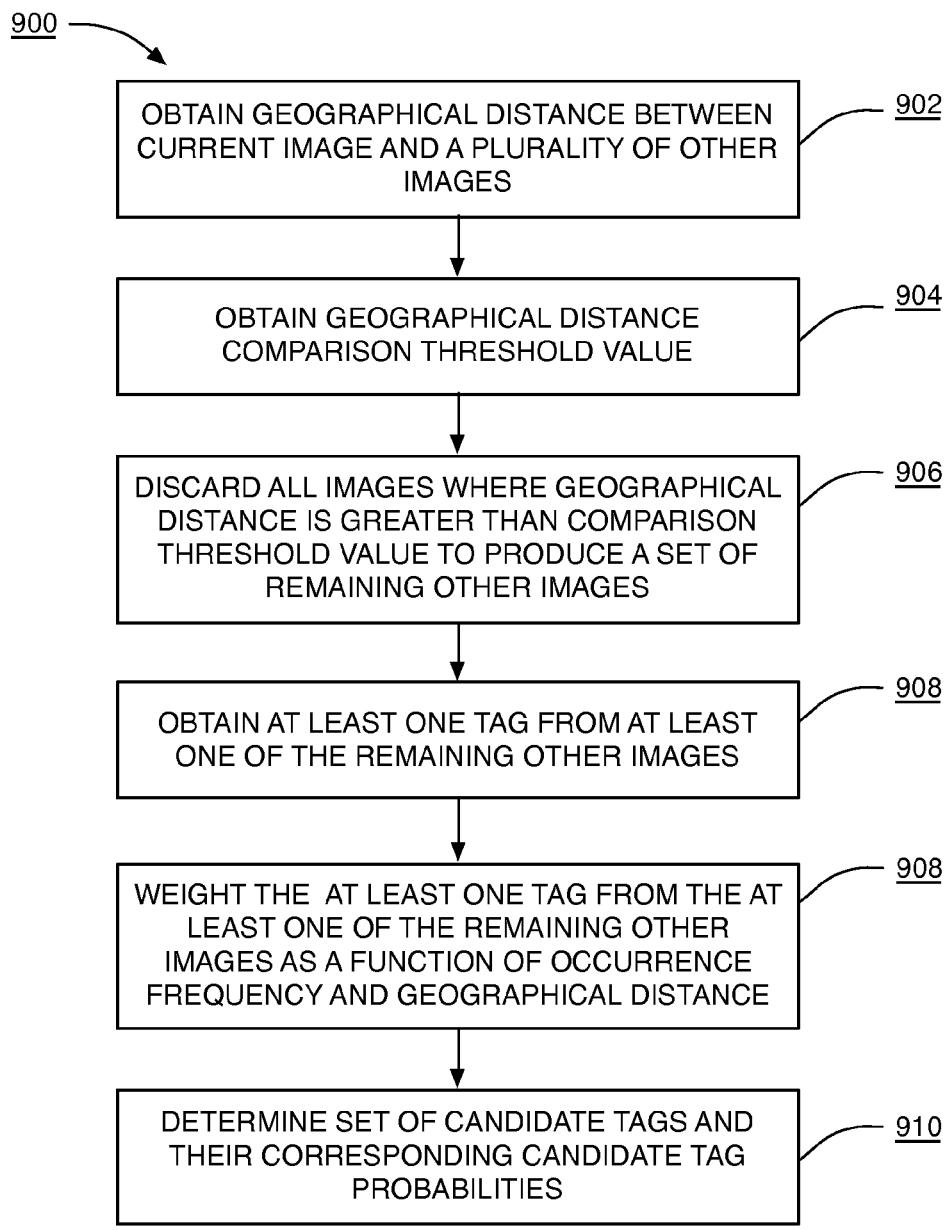
Figure 10:
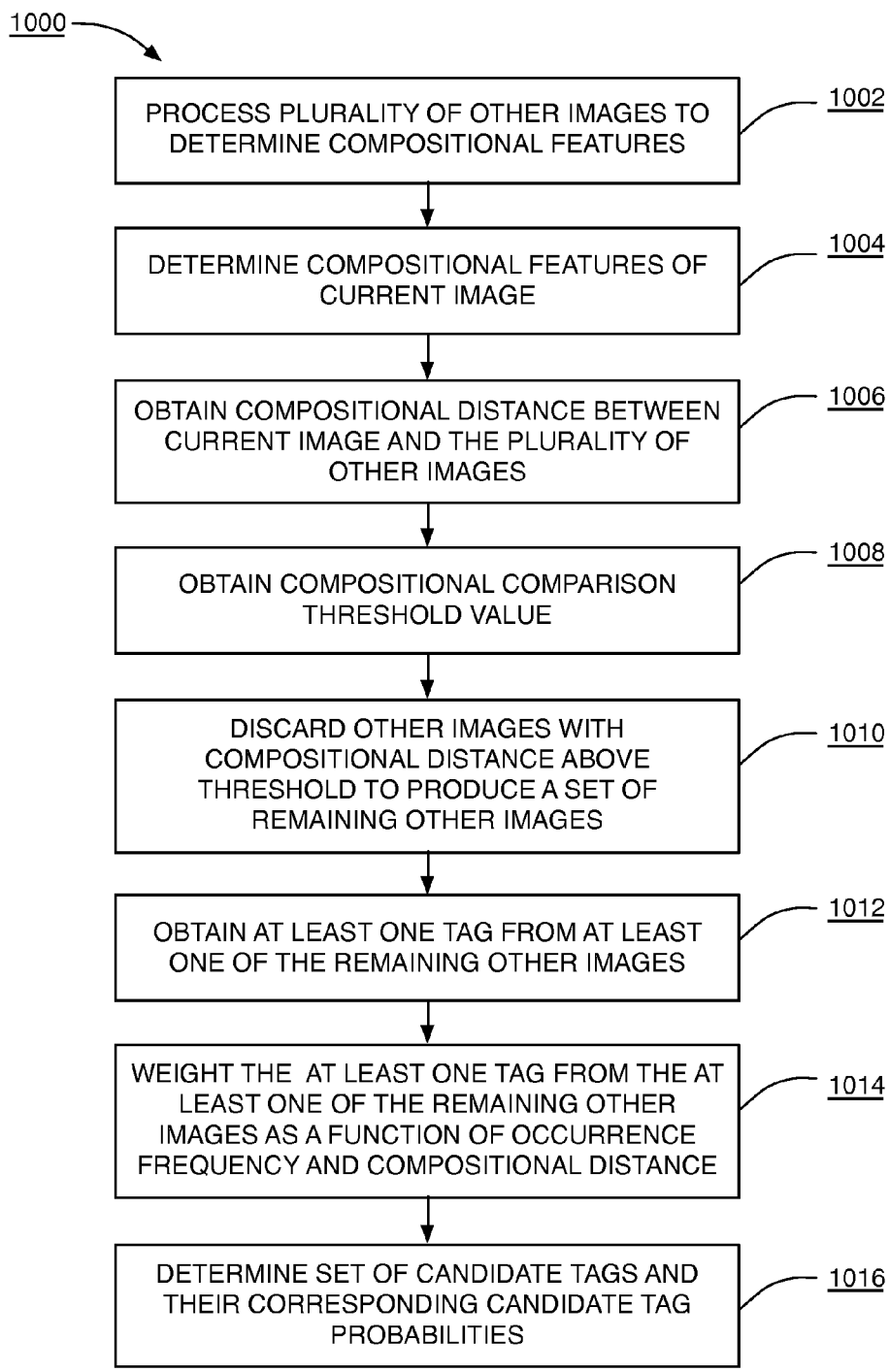
Figure 11:
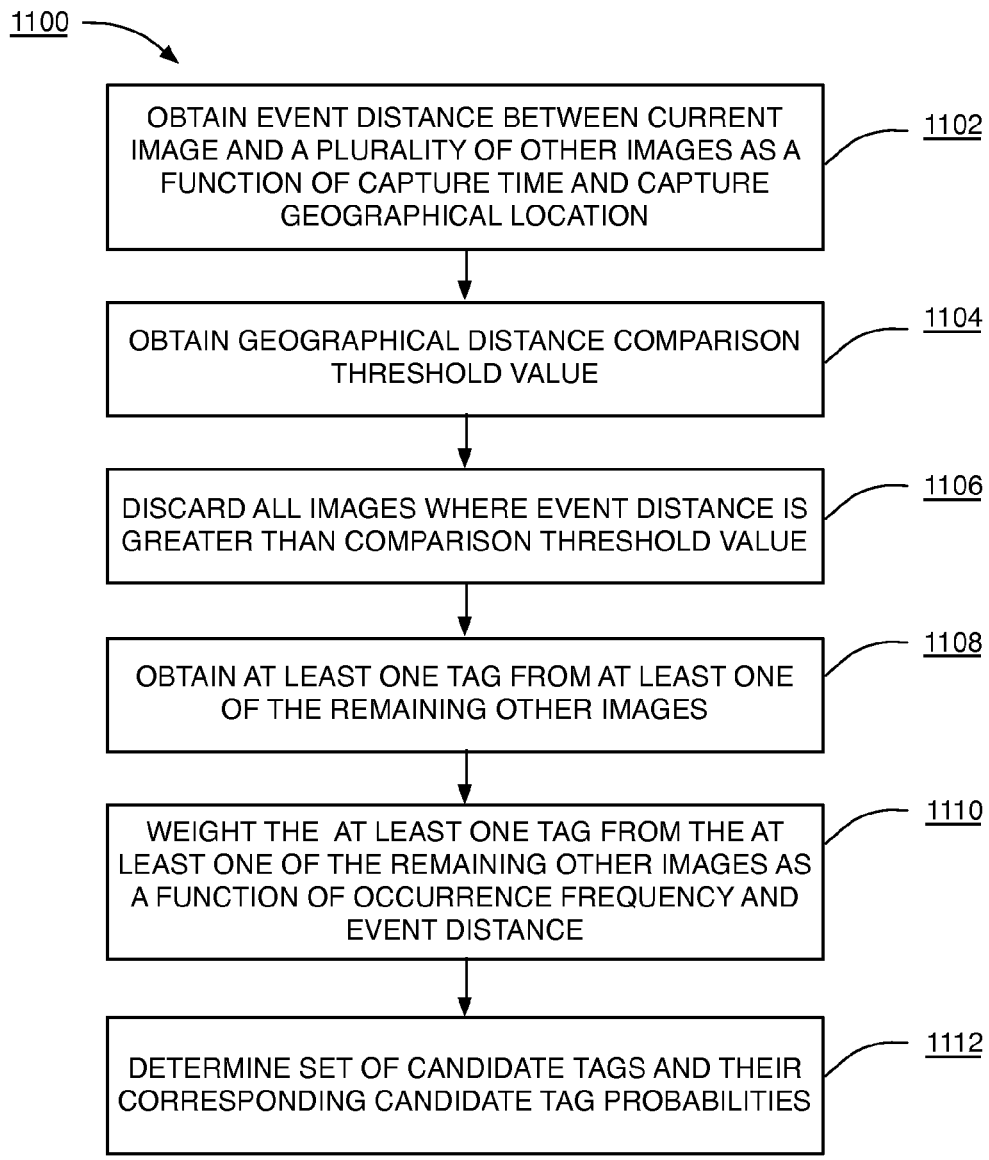
Figure 12:
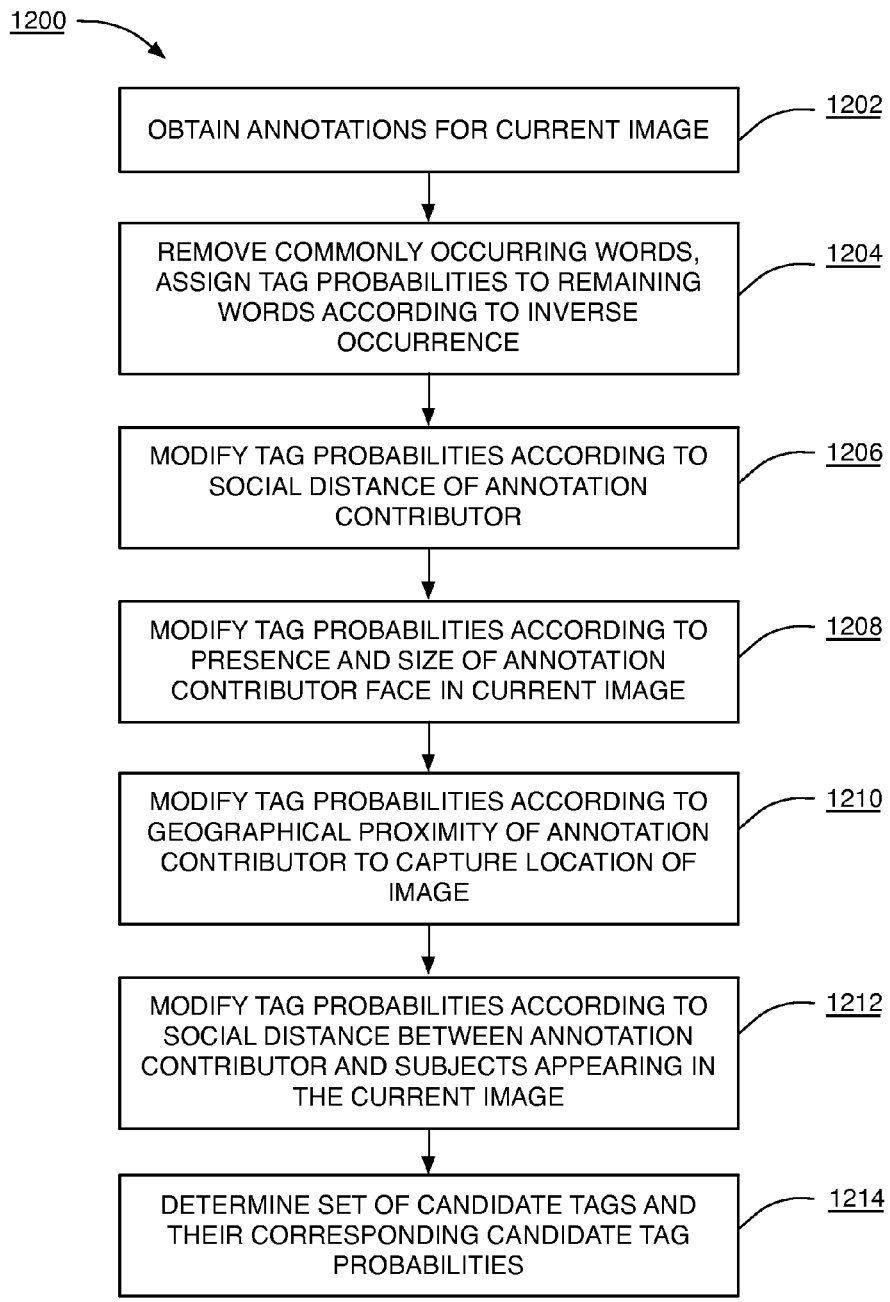
Figure 13:
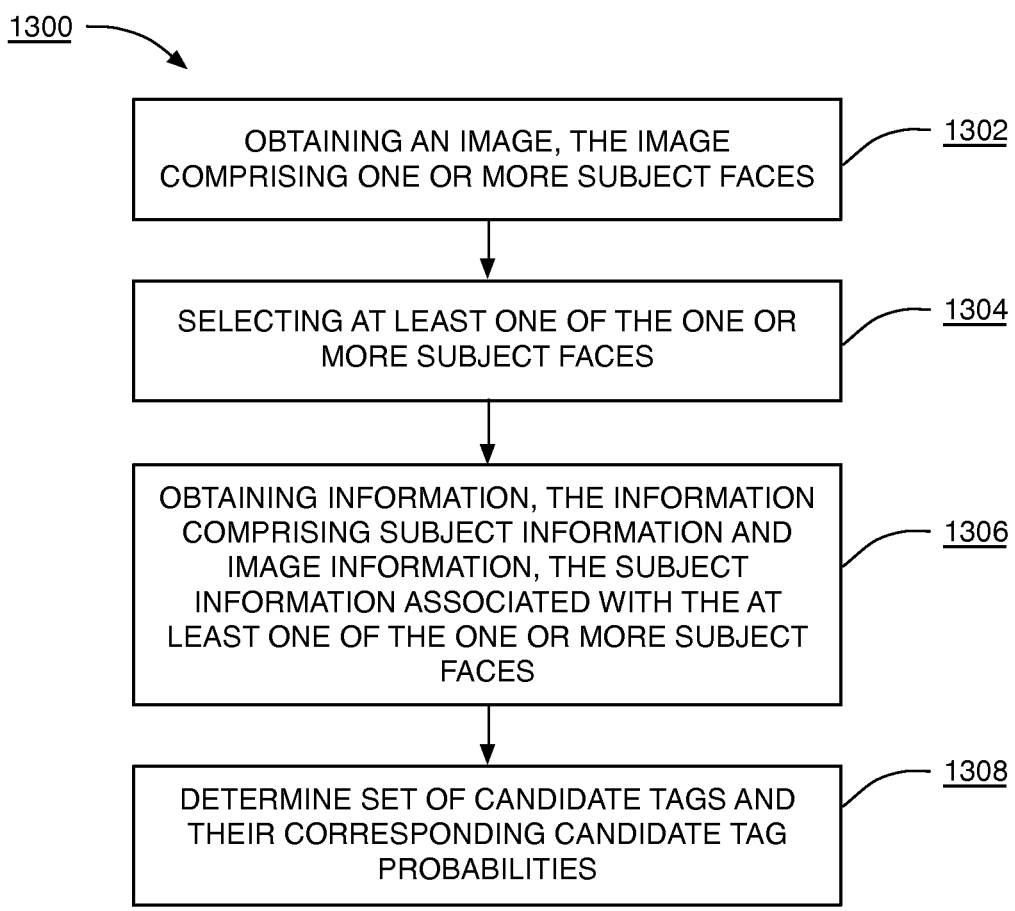
Figure 14:
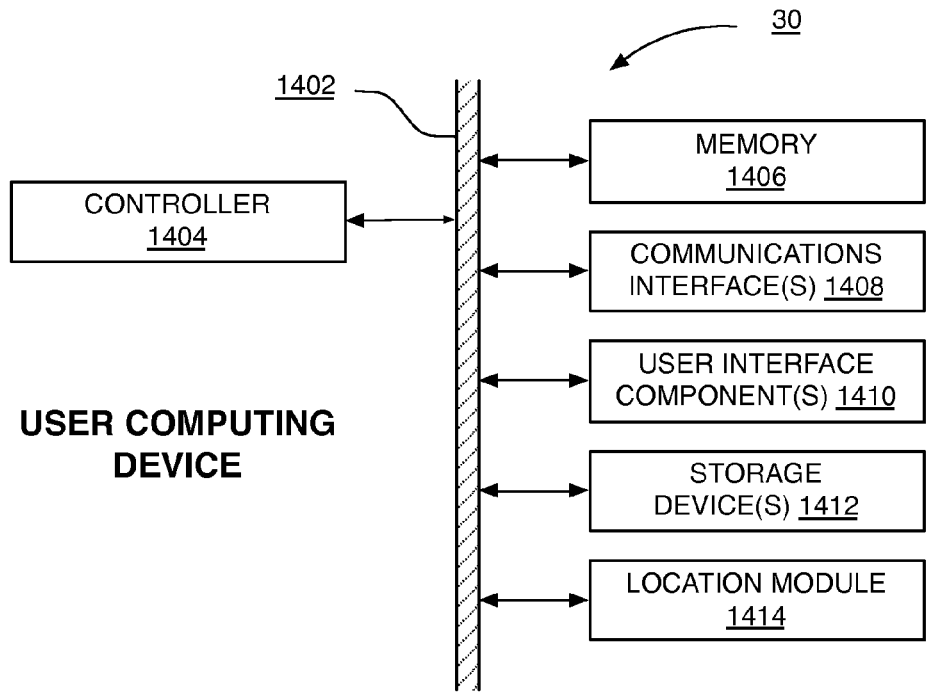
Figure 15:
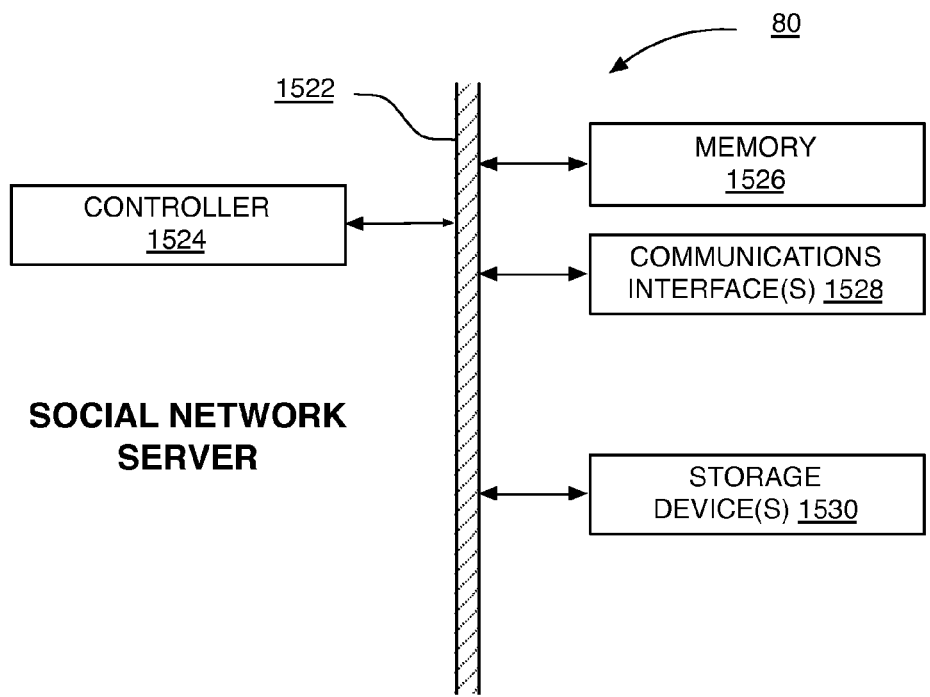

FIGS. 5B-E illustrate an expanded view of exemplary images shown in FIG. 5A according to an aspect of the present disclosure;

FIG. 6 illustrates a flowchart of an example method for implementing a tag recommender based on use of information including organizational, temporal, geographical, and compositional proximity according to an aspect of the present disclosure;

FIG. 7 illustrates a flowchart of an example method for implementation of a tag recommender based on the use of organizational proximity information according to an aspect of the present disclosure;

FIG. 8 illustrates a flowchart of an example method for an exemplary implementation of a tag recommender based on the use of interest time interval information according to one aspect of the present disclosure;

FIG. 9 illustrates a flowchart of an example method for implementing a tag recommender based on the use of geographical proximity information according to an aspect of the present disclosure;

FIG. 10 illustrates a flowchart of an example method for implementing a tag recommender based on the use of compositional proximity information according to one aspect of the present disclosure;

FIG. 11 illustrates a flowchart of an example method for implementing a tag recommender based on the use of event proximity information according to an aspect of the present disclosure;

FIG. 12 illustrates a flowchart of an example method for implementing a tag recommender based on the use of annotation information according to one aspect of the present disclosure;

FIG. 13 illustrates a flowchart of an example method for implementing a tag recommender based on the use of subject information according to one aspect of the present disclosure;

FIG. 14 is a block diagram of a user computing device according to an aspect of the present disclosure; and FIG. 15 is a block diagram of a social network server according to an implementation of the present disclosure.

DETAILED DESCRIPTION

The present disclosure is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

As referred to herein, the term "computing device" should be broadly construed. It can include any type of mobile device, for example, a smart phone, a cell phone, a pager, a personal digital assistant (PDA, e.g., with GPRS NIC), a mobile computer with a smart phone client, or the like. A computing device can also include any type of conventional computer, for example, a desktop computer or a laptop computer. A typical mobile device is a wireless data access-enabled device (e.g., an iPHONE® smart phone, a BLACKBERRY® smart phone, a NEXUS ONE™ smart phone, an iPAD™ device, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on a mobile device, the examples may similarly be implemented on any suitable computing device.

Operating environments in which embodiments of the present disclosure may be implemented are also well-known. In a representative embodiment, a computing device, such as a mobile device, is connectable (for example, via WAP) to a transmission functionality that varies depending on implementation. Thus, for example, where the operating environment is a wide area wireless network (e.g., a 2.5G network, a 3G network, or the proposed 4G network), the transmission functionality comprises one or more components such as a mobile switching center (MSC) (an enhanced ISDN switch that is responsible for call handling of mobile subscribers), a visitor location register (VLR) (an intelligent database that stores on a temporary basis data required to handle calls set up or received by mobile devices registered with the VLR), a home location register (HLR) (an intelligent database responsible for management of each subscriber's records), one or more base stations (which provide radio coverage with a cell), a base station controller (BSC) (a switch that acts as a local concentrator of traffic and provides local switching to effect handover between base stations), and a packet control unit (PCU) (a device that separates data traffic coming from a mobile device). The HLR also controls certain services associated with incoming calls. Of course, the present disclosure may be implemented in other and next-generation mobile networks and devices as well. The mobile device is the physical equipment used by the end user, typically a subscriber to the wireless network. Typically, a mobile device is a 2.5G-compliant device or 3G-compliant device (or the proposed 4G-compliant device) that includes a subscriber identity module (SIM), which is a smart card that carries subscriber-specific information, mobile equipment (e.g., radio and associated signal processing devices), a user interface (or a man-machine interface (MMI), and one or more interfaces to external devices (e.g., computers, PDAs, and the like). The mobile device may also include a memory or data store.

Figure 1:
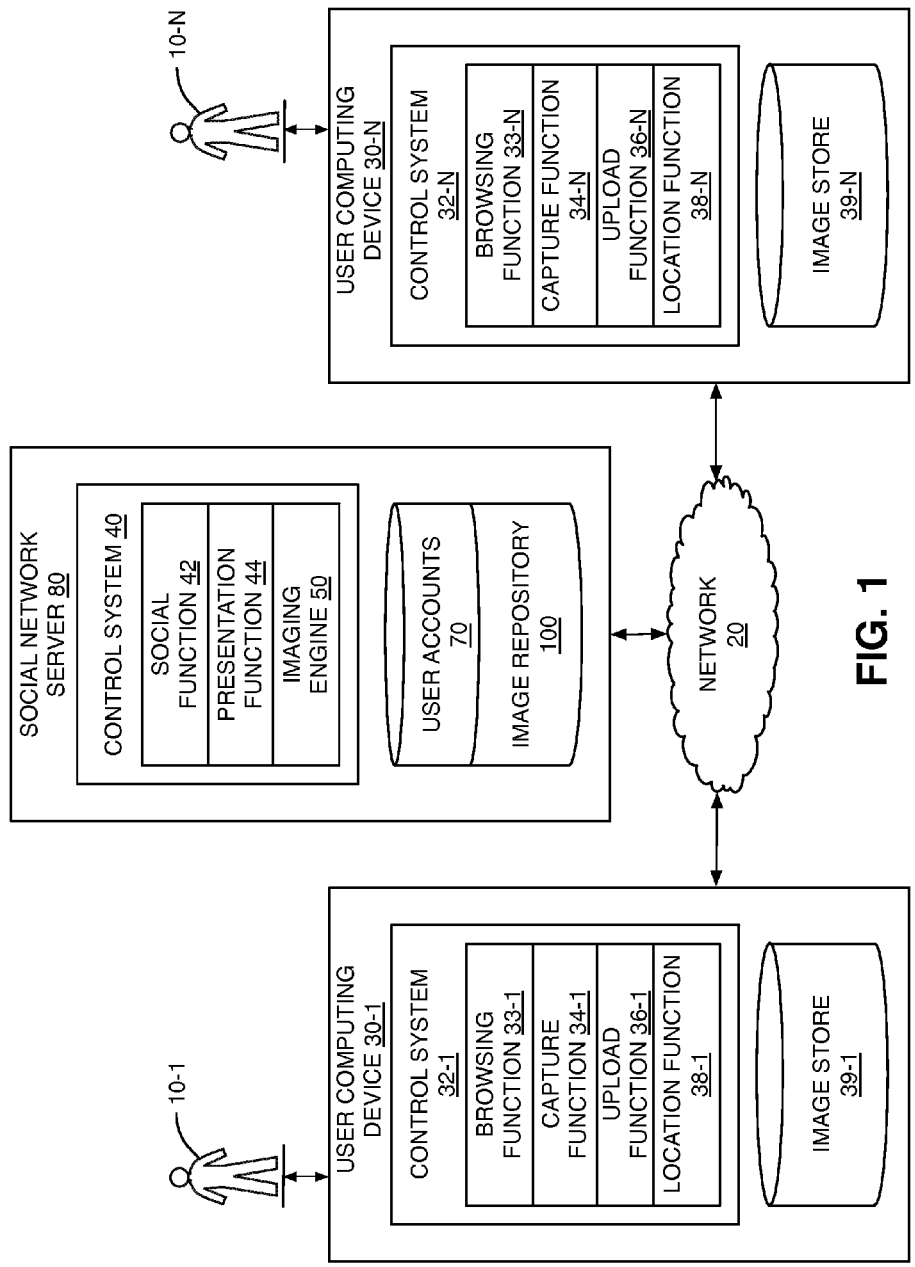
FIG. 1 illustrates a block diagram of an exemplary social network system for distributing and tagging images according to embodiments of the present disclosure.

The presently disclosed subject matter is now described in more detail. For example, FIG. 1 illustrates a block diagram of an exemplary social network system for distributing and tagging images according to embodiments of the present disclosure. Referring to FIG. 1, the social network system includes a social network server 80. The social network server 80 is configured to provide a user computing device 30-1 operated by a user 10-1 with an upload function 36-1 to transfer one or more images to the image repository 100. The images may be captured by an image capture device of the user computing device 30-1 or otherwise received by the user computing device 30-1. Subsequent to storage in the image repository 100, the images may be accessed for viewing by other users, such as user 10-N, by operation of his or her respective user computing device 30-N. The computing device 30-N and other computing devices may be configured for communication with the social network server 80 via a network 20.

The computing device 30-1 may be any type of computing device capable of receiving communications from another device. The computing device 30-1 comprises a number of functional components. This representation of the computing device 30-1 is meant to be for convenience of illustration and description, and it should not be taken to limit the scope of the present disclosure as one or more functions may be combined. Typically, these components are implemented in software (as a set of process-executable computer instructions, associated data structures and the like). One or more of the functions may be combined or otherwise implemented in any suitable manner (e.g., in hardware, in firmware, in combined hardware and software, or the like). The computing device 30-1 may include a graphics rendering engine for displaying information and images to the user 10-1 in the usual manner. The computing device 30-1 is Internet-accessible and can interact with the server 80, by use of any suitable Internet protocols such as HTTP, HTTPS, and the like. The server 80 is shown as a single device but this is not a requirement either; one or more programs, processes, or other code may comprise the server and be executed on one or more machines (in one or more networked locations).

The operation of the system can be described by the following example. As shown in FIG. 1, the computing device 30-N includes various functional components and associated data stores to facilitate the operation. The operation of the disclosed methods may be implemented using system components other than as shown in FIG. 1.

In this example, system, various images may be stored in an image repository 100. Access of user computing device 30-N or other computing devices to images stored in the image repository 100 may be based on permissions. Permissions associated with an image may be established by an owner of the image or another authorized individual. For example, the image owner 10-1 may interact with the computing device 30-1 to set a permission setting for an image and/or a portion of text associated with the image, such as an annotation or tag associated with the image. As an example, a permission setting may include one or more access modes. An access mode may be set for allowing friends only, friends of friends, members of a group of users, and all users to access an image and/or text associated with the image. In some instances, any user permitted to access an image may also be permitted to annotate the image.

Users 10 of the social network server 80 may interact with the server 80 using their respective user computing devices, such as computing devices 30-1 and 30-N. A user computing device may be, for example, a personal computer, tablet computer, smart phone, set top box, game console, or any device configured with computing hardware, software, and/or firmware configured to implement the functions of the user computing device in accordance with embodiments of the present disclosure. A user computing device, such as computing device 30-1 or 30-N, may include a control system (e.g., control systems 32-1 and 30-N), which is configured to communicate with and to interact with the social network server 80. In an implementation, a browsing function, such as browsing function 33-1 or 33-N, is a web browser capable of communicating with the social network server 80 using HTTP protocols and rendering HTML at the corresponding user computing device. A capture function, such as capture functions 34-1 or 34-N, may operate to manage the capture of images by an image capture device of the computing device, and the subsequent storing of the images in an image stored (e.g., image stores 39-1 and 39-N) and/or the image repository 100. Transmission of the images from a user computing device to the social network server 80 may be implemented by an upload function, such as upload functions 36-1 and 36-N. A location function, such as location functions 38-1 and 38-N, may operate to determine geographical coordinates of a location at which one or more images were captured by the capture function 34-1 or 34-N for the purpose of storing or otherwise associating the capture location with the image(s). Note that some user computing devices may not include all functions described herein. For example, some devices may not include an image capture function.

The social network server 80 may be comprised of a number of functions. For example, the server 80 may include a control system 40 comprising a social function 42 configured to create user accounts for storage in a user accounts database 70. The social function 42 may control user account creation, management, invitation of friends, acceptance of the rejection of invitations, the formation and management of groups, permissions and management of friends, and monitoring and archiving user activities. A presentation function 44 may operate to provide rendering of web pages created at the social network server 80 and displayed at the user computing device 30. An exemplary web page is depicted in FIG. 3A, which illustrates a screen display of the example web page in accordance with embodiments of the present disclosure. An imaging engine 50 may implement all functions associated with the interaction involving images and is further detailed in the example of FIG. 2A, which illustrates a block diagram of an example imaging engine in accordance with embodiments of the present disclosure. In an implementation of the present disclosure, the social function 42, presentation function 44, and imaging engine 50 are implemented as part of the same social network server 80, but that need not be the case. For performance and scalability reasons, these functions may be implemented as separate servers or computing arrangements.

Those of ordinary skill in the art will appreciate that the network 20 is not limited by the implementations listed above. More specifically, the network 20 may be any type of network 20 suitable to allow interaction between the user computing devices 30-1 and 30-N and the social network server 80. For example, the network 20 may be a wired network, a wireless network, or any combination thereof. Further, the network 20 may include a distributed computing network, an intranet, a local-area network (LAN) and/or a wide-area network (WAN), or any combination thereof.

Figure 2B:
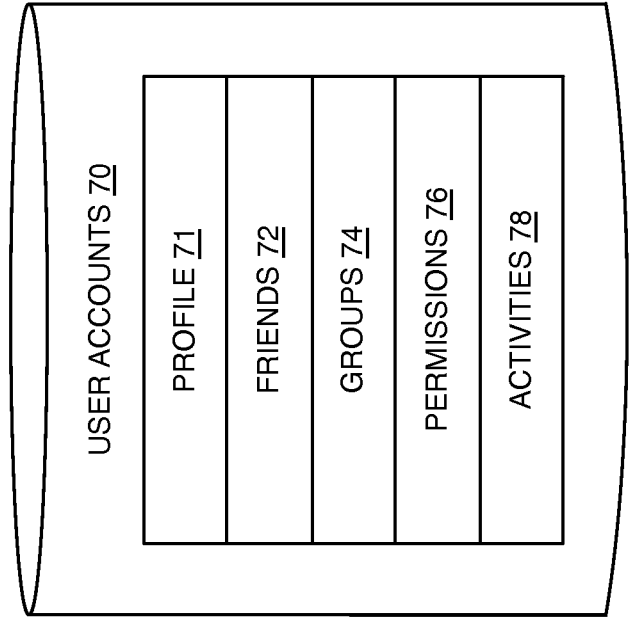
FIG. 2B illustrates a block diagram for an exemplary implementation of a user accounts store according to an implementation of the present disclosure.
Figure 2A:
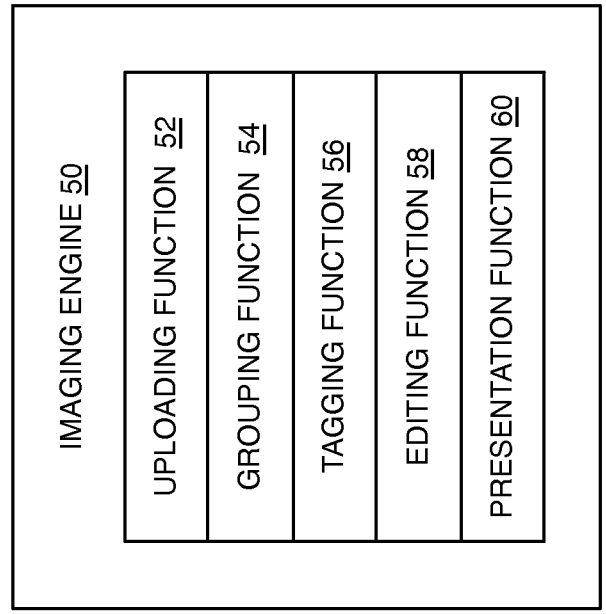
FIG. 2A illustrates a block diagram of an example imaging engine in accordance with embodiments of the present disclosure.
Figure 3A:
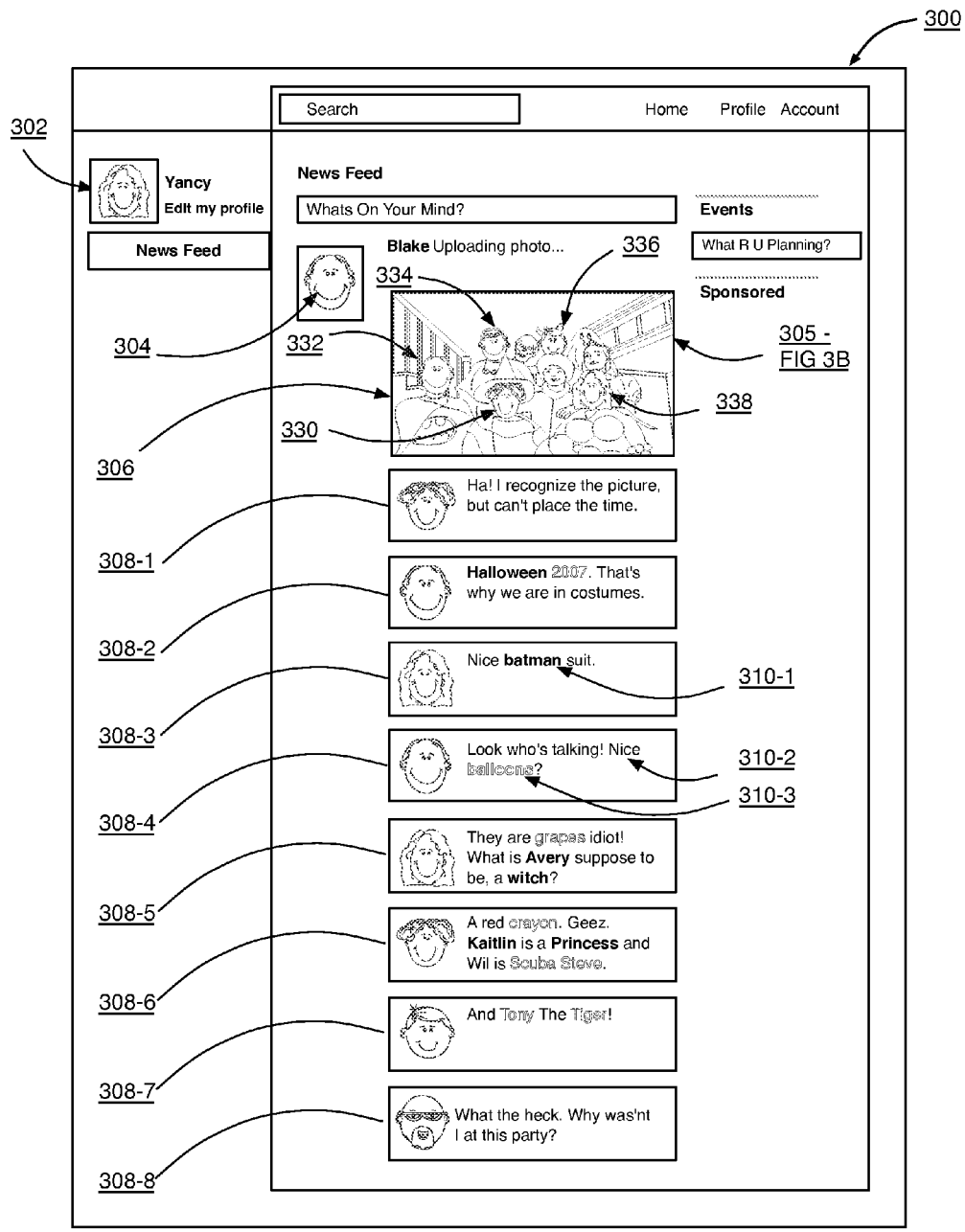
FIG. 3A illustrates a screen display showing an exemplary user interface for the interactive tagging of images according to one aspect of the present disclosure.

FIG. 2A illustrates a block diagram of an exemplary implementation of an imaging engine 50 according to an aspect of the present disclosure. Referring to FIG. 2A, the imaging engine 50 may include an uploading function 52 configured to receive uploaded images 102 from a computing device, such as the user computing device 30-1 shown in FIG. 1 via its upload function 36-1. Accordingly, a grouping function 54 may be configured to allow the user computing device 30-1 to assign and modify the grouping of uploaded images. The grouping may be specified at the time of upload, or it may be changed at a later time using the browsing function 33-1.

The image may be tagged using a tagging function 56. One form of tagging may involve tagging subject faces occurring in the images. As used herein, a subject face may refer to the face of a subject (e.g., a person) that appears in an image. The subject may represent a registered user, such as user 10-1, of the system, an unregistered user of the system, or a non-user. There are several mechanisms that have proven to provide acceptable results with varying levels of user involvement. One such system involves a user uploading images to their account on a social networking system such as FACEBOOK®. Once uploaded, any friends of the user who are able to access the uploaded images may use his or her computing device to tag faces within the images. Example benefits of this solution include distributing the effort over multiple participants, notifications to tagged subjects, and a uniform name space of tagged subjects. Other solutions for tagging faces in images include programmatic approaches. In these systems, a computer may be programmed to detect faces within the images, and then identify the subjects corresponding to the faces by matching the detected faces to a set of known subject images. In some systems, such as IPHOTO®, the user is required to confirm the matches. In other systems, such as PICASSO®, no user confirmation is required. Example benefits of this approach include the efficiency inherent in having a computer identify the subject faces. As a result, large numbers of images may be processed efficiently.

An editing function 58 may be configured to provide for the manipulation of images. In an implementation of the present disclosure, image editing functions may include cropping, rotation, resizing, brightness modification, contrast modification, exposure modification, tone modification, and the like. A presentation function 60 may be configured to render an image or group of images within a presentation environment such as the exemplary web page shown in FIG. 3A.

FIG. 2B illustrates a block diagram for an exemplary implementation of a user accounts store 70 according to an implementation of the present disclosure. User accounts store 70 may include information about a user (e.g., user 10-1 or 10-N) of the social network server 80. A profile 71 may include information describing the user. In an implementation of the present disclosure, the profile 71 information may include gender, age, birthday, marital status, residential address, favorite songs, favorite movies, favorite books, and the like. Users may include one or more friends 72 established through an invitation process provided by the social function 42 shown in FIG. 1. Friends may be assigned to groups 74 for the purpose of assigning permissions 76. Activities 78 for users may be monitored and recorded for future use. In an aspect of the present disclosure, this activity information might include locations visited, movies watched, URLs browsed, songs listened to, items purchased, and the like.

Figure 2C:
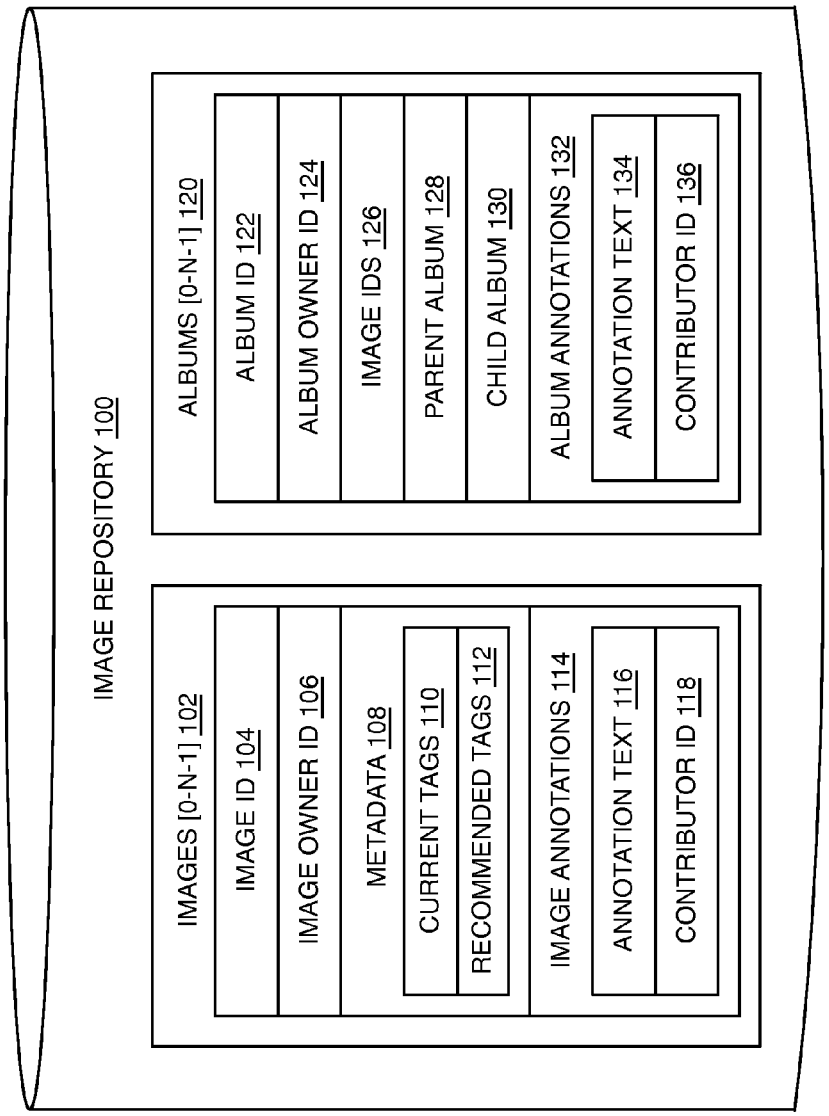
FIG. 2C illustrates a block diagram of an exemplary image repository according to an aspect of the present disclosure.

FIG. 2C illustrates a block diagram of an exemplary image repository 100 according to an aspect of the present disclosure. The image repository 100 is comprised of a plurality of images 102. Images 102 are comprised of multiple elements. For example, an image 102 may be associated an image ID 104 is a unique identifier assigned to the image. An image owner ID 106 contains identification information indicating the user 10 who uploaded the image. A metadata field 108 contains information about the contents of an image 102. Examples of metadata may include, but are not limited to, capture date, capture time, camera capture settings, camera make model and serial number, capture location, tags, and the like. As used herein, a tag is a non-hierarchical keyword or term assigned to a piece of information such as a digital image. This kind of metadata helps describe an item and allows it to be found again by browsing or searching. Tags may be generally chosen informally and personally by the item's creator or by its viewer, depending on the system. In other approaches, tags may be chosen from pre-defined vocabularies. Current tags 110 indicate the tags currently associated with the image 102. Recommended tags 112 indicate the tags that have been recommended for association with the image 102. The same tag may appear as both a current tag 110 and a recommended tag 112 if a recommended tag 112 has been associated with the image 102 as a current tag 110. Images 102 may each have a plurality of annotations 114. Annotations 114 may each be comprised of annotation text 116 and a contributor ID 118 of the user who authored the annotation 116.

Images may be grouped into an album 120. Albums may be assigned an album ID 122. The user 10 who owns the album is referenced by the album owner ID 124. The images 102 comprising the album 120 are referenced by their image ID 104 126. Albums may be constructed in a hierarchical structure, containing images and other albums. A parent album 128 may reference an album containing an album. A child album 130 contains references to other albums contained in an album. Albums may also contain annotations 132. The annotations are comprised of annotation text 134 and a contributor ID 136 referencing the user 10 who contributed the annotation.

Recommended tags 112 may be determined as needed, or they may be determined as part of a batch job that is run on a periodic basis. The tags may be stored as part of the image file or in a separate database or file referring to the image.

Figure 3B:
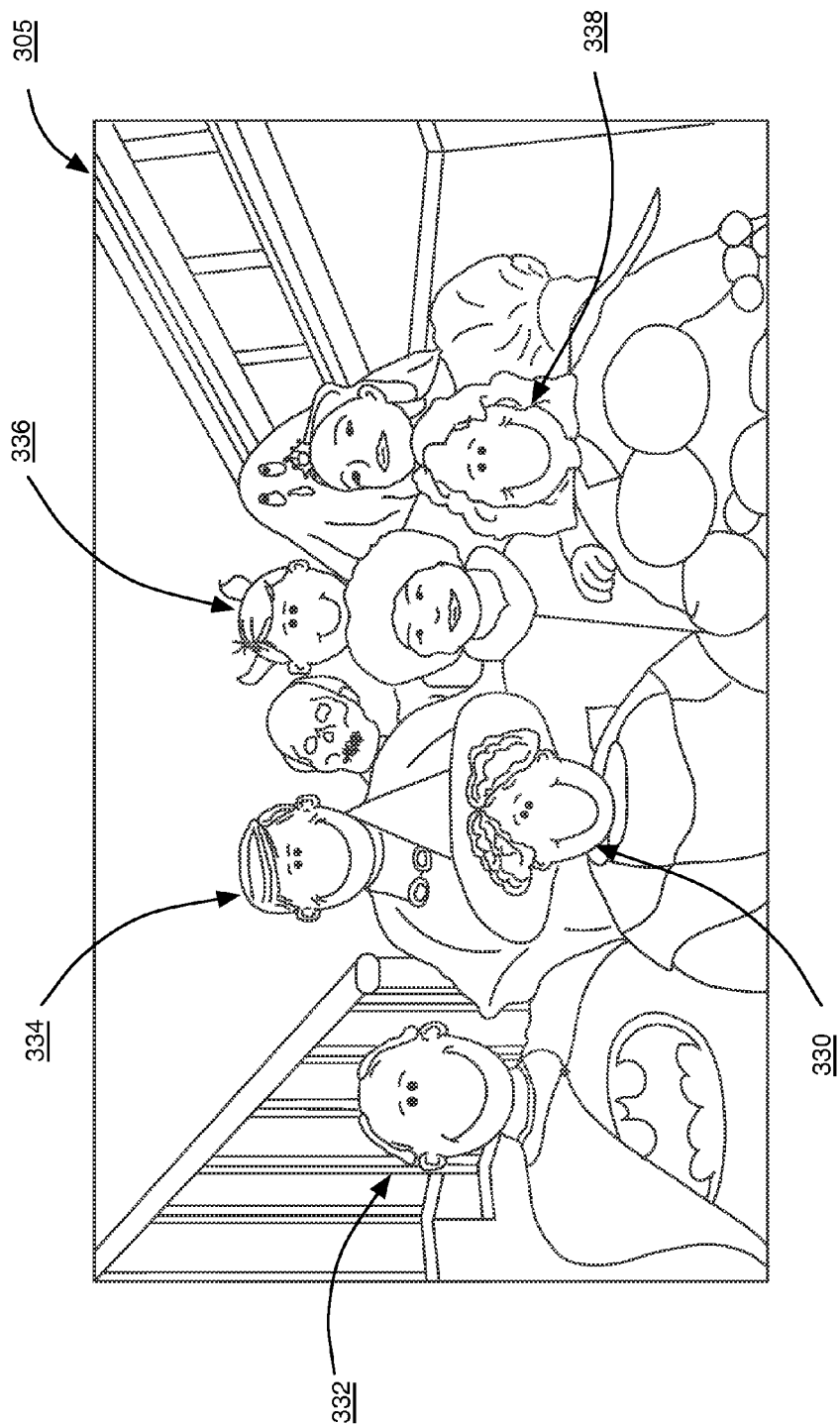
FIG. 3B illustrates an expanded view of an exemplary image shown in FIG. 3A according to one aspect of the present disclosure.

Referring to FIG. 3A, the web page may be used to implement an user interface for the interactive tagging of images according to an implementation of the present disclosure. In an aspect of the present disclosure, the user computing device 30-1 of FIG. 1 may communicate with the social network server 80 via a web browser implemented by the browsing function 33-1 to render the web page 300. The web page 300 depicts an exemplary webpage generated by the social network server 80 and rendered by the user computing device 30-1. An image 302 of the user 10-1 may be displayed at a portion of the web page 300. The user 10-1 may be friend a second user 10-N, an image 304 of whom is displayed within a portion of the web page 300. The user 10-N shown in image 304 has posted an image 305 to the social network server 80. The image 305 is also depicted in FIG. 3B for ease of viewing. Subject faces 338 and 332 of both the users 10-1 and 10-N, respectively are both present in the image 305, along with subject faces 330, 334, and 336 other users of the social network. The subject faces 330, 332, 334, 336, and 338 have been tagged with the name and ID of the corresponding social network user. After the image 305 has been uploaded to the social network server 80, others users may contribute annotations 308-1-308-8 for the image 305.

Depending on access settings, image annotations for the image 305 may be contributed by friends of the image owner 10-1, friends of friends, any user of the social network, users appearing in the image, friend of users appearing within the image, users at the same event at which the image was captured, and the like. In some instances, those users contributing annotations for the image may correspond to subject faces found within the image 305.

Again referring to FIG. 3A, the text for the annotations may be rendered according the example method of FIG. 4A, with the words of the annotation occurring in different visual styles according to their status as either current tags 310-3, recommended tags 310-1, or plain words 310-2. In the example web page 300, current tags 310-1 are rendered in a bolded font, the recommended tags 310-2 are rendered in an outlined font, and the plain words 310-2 are rendered in a non-styled font. A user whose face (e.g., face 330) appears in the image 305 has contributed a first annotation 308-1. Other users whose image 332 and 336 who also appear in the image 305 have also contributed annotations 308-2, 308-3, and 308-7. Users who are not in the image 305 may also contribute annotations 308-8.

FIG. 4A illustrates a flowchart that shows an example method 400 of rendering formatted annotations 400 and refreshing the formatted annotations in response to user input. The method begins with obtaining 402 or receiving an image. In an aspect of the present disclosure, the image has be uploaded to a social networking site and annotated by users of that social network. Annotations for the image may be obtained or retrieved 404. Further, any current tags 110 assigned to the image may be obtained or retrieved 406.

Based on a number of factors, a set of recommended tags 112 are determined 408 for the image. Annotations for the image are subsequently formatted 410 according to type. Any current tags 110 may be formatted in a first visual style, any recommended tags 112 may be formatted in a second visual style, and any words in the annotations that are neither current tag 110 words or recommended tag 112 words may be plain annotation words and may be formatted in a third visual style. In an implementation of the present disclosure, the first and second visual styles may take the form of color coded hyperlinks with the first and second styles being assigned different colors, but both styles being shown with an underline. In this example implementation, plain annotation words are rendered in a default style, i.e. with no special coloring or underlining. The formatted annotations are subsequently displayed in an area adjacent to the image.

Figure 4B:
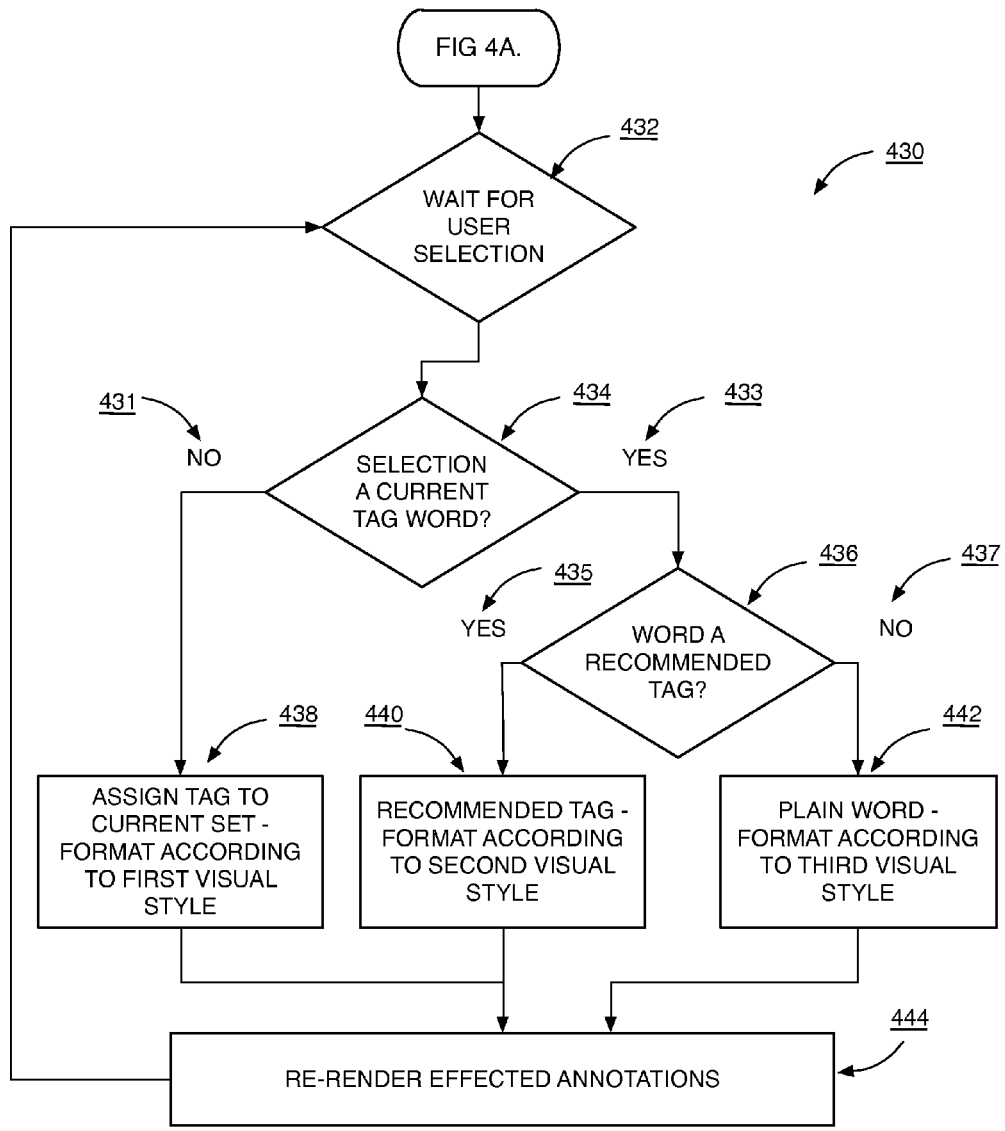
FIG. 4B illustrates a flowchart of an example method of the handling of users interacting with formatted text.

FIG. 4B illustrates a flowchart of an example method of the handling of users interacting with formatted text. For example, the formatted text may be the formatted text produced in the example of FIG. 4A. The method may start by waiting for the user to click or otherwise select 432 on either a current tag formatted in a first visual style or a recommended tag formatted in a second visual style. Subsequently, it is determined 434 whether the selection is a current tag word. If the selection is not a current tag word 431, the selected word may be assigned 438 to the current tag set with the format being according to a first visual style. If the selected word is a current tag 433, a check is performed to determine 436 if the word is a recommended tag. If the selected word is a current tag 435, the word is formatted 440 according to a second visual style as a recommended tag. If the word is not a current tag 437, the word may be formatted 442 according to a third visual style as a plain word. Subsequent to steps 438, 440, and 442, the reformatted annotations may be re-rendered 444 to display the current version.

FIG. 5A is a graphical depiction of a set of images and proximity information that can be derived from the images based on time, location, organization, and composition according to an aspect of the present disclosure. FIGS. 5B-E illustrate an expanded view of exemplary images shown in FIG. 5A according to an aspect of the present disclosure. The first two images $I_1$ 532 and $I_2$ 534 were captured at times $T_1$ 522 and $T_2$ 524 and locations $P_1$ 502 and $P_2$ 504, respectively. The images $I_1$ 532 and $I_2$ 534 are stored in the same container or album 518. The second two images $I_3$ 536 and $I_4$ 538 were captured at times $T_3$ 526 and $T_4$ 528 and locations $P_3$ 506 and $P_4$ 508, respectively. The second two images $I_3$ 536 and $I_4$ 538 are stored in the same container or album 520.

As used herein, temporal proximity refers to the relative closeness in capture time between two images, and varies as the inverse of the time differential. A timeline 530 is shown with the capture time for the four images. For example images $I_1$ 532 and $I_2$ 534 have a capture time delta of $T_2-T_1$, and images $I_3$ 536 and $I_4$ 538 have a capture time delta of $T_4-T_3$, respectively. Therefore, images 532 and 534 have a greater temporal proximity than images 536 and 538.

Equation 1 below shows an example formula for computing temporal proximity between two images according to an implementation of the present disclosure. The temporal proximity ($P_T$) may be determined as one over the capture time differential $\Delta_T$. Other schemes for determining temporal proximity will be apparent to one of ordinary skill in the art upon reading this disclosure and are to be considered within the scope of the present disclosure.

$$P_T = \frac{1}{\Delta_T} \quad \text{Equation (1)}$$

As used herein, geographical proximity refers to the relative closeness in capture location between two images, and varies as the inverse of the location distance differential. A location grid 500 is shown with the capture location for the four images. For example, images 532 and $I_2$ 534 have a capture location delta of $P_2-P_1$, and images $I_3$ and $I_4$ have a capture location delta of $P_4-P_3$ respectively. Therefore, images 532 and 534 have a greater geographical proximity than images 536 and 538.

Equation 2 below shows the formula for computing geographical proximity between two images according to one implementation of the present disclosure. The geographical proximity ($P_{GP}$) is determined as one over the capture geographical location differential ($\Delta_{GL}$). Other schemes for determining geographical proximity will be apparent to one of ordinary skill in the art upon reading this disclosure and are to be considered within the scope of the present disclosure.

$$P_{GP} = \frac{1}{\Delta_{GL}} \quad \text{Equation (2)}$$

As used herein, compositional proximity refers to the relative closeness in composition between two images, and varies directly with the number of like features found in both images. In an aspect of the present disclosure, features may be taken to be subject faces appearing in images. As such, if images $I_1$ 532 and $I_2$ 534 have three subject faces in common, and images $I_3$ 536 and $I_4$ 538 have two subject faces in common. It follows that images $I_1$ 532 & $I_2$ 534 have a greater compositional proximity than $I_3$ 536 and $I_4$.

Equation 3 below shows the formula for computing compositional proximity between two images according to one implementation of the present disclosure. The compositional proximity ($P_C$) is determined as summation of all feature matches ($M_{CF}$) between two images. Other schemes for determining compositional proximity will be apparent to one of ordinary skill in the art upon reading this disclosure and are to be considered within the scope of the present disclosure.

$$P_C = \sum_{k=0}^{N-1} M_{CF}[k] \quad \text{Equation (3)}$$

As used herein, organizational proximity refers to the relative closeness in grouping between two images and varies as the inverse of the grouping distance differential. Two albums 518 520 are shown in FIG. 5A, both containing two images. Organizational proximity can be measured by comparing the number of hops between the storage locations of two images. For example, two images occurring in the same album would require zero hops to traverse between them, and therefore exhibit the highest organizational proximity. Two images occurring in two different child albums within the same parent album would require two hops to traverse, and therefore exhibit a lower organizational proximity. Equation 4 below shows the formula for computing organizational proximity between two images according to one implementation of the present disclosure. The organizational proximity ($P_O$) is determined as one over the number of hops (H) between the storage locations plus one of the two images. Other schemes for determining organizational proximity will be apparent to one of ordinary skill in the art upon reading this disclosure and are to be considered within the scope of the present disclosure.

$$P_O = \frac{1}{H+1} \qquad \text{Equation (4)}$$

FIG. 6 illustrates a flowchart of an example method for implementing a tag recommender based on use of information including organizational, temporal, geographical, and compositional proximity according to an aspect of the present disclosure. Referring to FIG. 6, the method starts by obtaining or receiving 602 current tags 110 associated with the current image. As used herein, the current image refers to the image being operated on. Candidate tags may be determined and/or recommended 606 based on organizational proximity, wherein the organizational proximity is exploited to find tags from images stored near the current image. Candidate tags are determined and/or recommended 608 based on temporal proximity, wherein the temporal proximity is exploited to identify tags from images captured in the same interest time interval as the current image. Candidate tags are determined and/or recommended 610 based on geographical proximity, wherein the geographical proximity is exploited to identify tags from images captured geographically near the current image. Candidate tags are determined and/or recommended 612 based on compositional proximity, wherein the compositional proximity is exploited to identify tags from images with similar features as the current image. Candidate tags are determined and/or recommended 614 based on event proximity, wherein the event proximity is exploited to identify tags from images captured near the same time and place as the current image. Candidate tags are determined and/or recommended 616 based on image annotations, wherein the image annotations are exploited to identify tags from the words comprising the annotations. Candidate tags are determined and/or recommended 618 based on subject face associations, wherein the subject faces comprising the image are exploited to identify tags commonly associated with the user corresponding to the subject. The candidate tag results from the recommenders may be blended together to determine a set of recommended tags, and their corresponding probability weightings.

As used herein, candidate tag refers to any tag considered by a final recommender. In one implementation, FIG. 7-FIG. 13 represent the sub recommenders and FIG. 6 represents a final tag recommender. Candidate tags are optionally accompanied by corresponding probabilities. The probabilities provide a weighting of the candidate tags. A candidate tag with a high weighting or probability being a better potential fit than a candidate tag with a lower weighting or probability. Not all of the sub recommenders need be used together. Depending on the application, they may be used in any order or combination or they may be integrated directly into the final recommender in any order or combination.

Referring now to FIG. 7, the figure illustrates a flowchart of an example method 700 for implementation of a tag recommender based on the use of organizational proximity information according to an aspect of the present disclosure. As described with respect to FIG. 5A, the organizational distances between the current image 305 and a plurality of other images 102 stored at the social network server 80 image repository 100 is obtained or otherwise received 702. An organizational comparison threshold value is obtained 704, and compared against the organizational distances 702. The plurality of other images for which the organizational distance is greater than the organizational comparison threshold value is discarded 706. The organizational comparison threshold value is a value that may be predetermined, or may be determined dynamically as the system operates. Assuming that at least one image has a organizational distance less than or equal to the organizational comparison threshold value, at least one tag is obtained 708 from the at least one other image. In an implementation of the present disclosure, the social network server 80 user 10-1 shown in FIG. 1 may have many images stored in the image repository 100 stored in different groups, some of which may be part of other groups 54 as part of a hierarchical storage system. As a result, a plurality of other images should have organizational distances falling below or equal to the organizational comparison threshold value. In an aspect of the present disclosure, the tags are assigned 710 probability weightings as a function their occurrence frequency in the set of remaining other images and their corresponding organizational distances. The result of the flowchart is a determined 712 set of candidate tags and their associated probabilities. Depending on the sparsity of images stored on the social network server 80 image repository 100, the number of candidate tags produced may be zero, one, or a plurality.

FIG. 8 illustrates a flowchart of an example method 800 for an exemplary implementation of a tag recommender based on the use of interest time interval information according to one aspect of the present disclosure. Referring to FIG. 8, a series of time intervals are identified for which the same tags are often assigned to the images captured during the time interval. The time intervals are defined by a start time and duration. An example of a interest time interval would be Christmas, and examples of the corresponding tags commonly assigned to images taken during this interest time interval might be: angel, bell, candles, eggnog, gifts, holly, joy, kings, manger, nativity, peace, reindeer, santa, tinsel, yuletide, play, snow, and the like. The method begins with a plurality of images being examined or otherwise processed 802 to determine interest time intervals during which a common set of tags are more likely to be applied to images captured during this time period. When an image is selected for tagging, the time at which the image was captured is obtained and compared 804 against the list of identified interest time intervals. If the image is matched against a time interval, tags associated with the time interval are obtained 806. The tags are weighted 808 according to how often they occur during the time interval minus their normal occurrence rate. The result of the flowchart is a set of candidate tags and their associated probabilities 810. Note that time intervals may overlap, and as a result an image may fall in multiple interest time intervals. For example an image captured during the "Easter" time interval may also occur during the "Spring" interest time interval.

FIG. 9 illustrates a flowchart of an example method 900 for implementing a tag recommender based on the use of geographical proximity information according to an aspect of the present disclosure. As described with respect to FIG. 5, the geographical distances between a current image and a plurality of other images stored at a social network server 80 image repository 100 is obtained or otherwise received 902. Subsequently, a geographical comparison threshold value is obtained or otherwise received 904, and compared against the geographical distances. The plurality of other images for which the geographical distance is greater than the geographical comparison threshold value is discarded 906. The geographical comparison threshold value is a value that may be predetermined, or may be determined dynamically as the system operates. Assuming that at least one image has a geographical distance less than or equal to the geographical comparison threshold value, at least one tag is obtained from the at least one other image 908. In an aspect of the present disclosure, the social network server 80 may have many images stored in its image repository 100. Some of these images may not have geographical capture location data available, but many of the images may. Those images lacking capture location data availability may be treated as having infinite geographical distances and can therefore be discarded from the calculation 906. As a result, a plurality of other images may have geographical distances falling below or equal to the geographical comparison threshold value. In an aspect of the present disclosure, the tags are assigned probability weightings as a function their occurrence frequency in the set of remaining other images and their corresponding geographical distances 910. The result of the flowchart is a set of candidate tags and their associated probabilities 912. Depending on the sparsity of images stored on the social network server 80 image repository 100, the number of candidate tags produced may be zero, one, or a plurality.

FIG. 10 illustrates a flowchart of an example method 1000 for implementing a tag recommender based on the use of compositional proximity information according to one aspect of the present disclosure. The method may include processing 1002 a plurality of other images to determine compositional features. For example, As described with respect to the example of FIG. 5, the compositional distances between a current image and a plurality of other images stored at a social network server 80 image repository 100 is obtained or otherwise received. Further, the method may include determining 1004 compositional features of a current image. The method also includes obtaining 1006 compositional distance between the current image and the plurality of other images. For example, compositional comparison threshold value is determined or obtained, and compared against the compositional distances. The plurality of other images for which the compositional distance is greater than the compositional comparison threshold value are discarded. The compositional comparison threshold value is a value that may be predetermined, or may be determined dynamically as the system operates. The method includes obtaining 1008 a compositional comparison threshold value. Assuming that at least one image has a compositional distance less than or equal to the compositional comparison threshold value, at least one tag is obtained from the at least one other image. In an implementation of the present disclosure, the social network server 80 may have many images stored in the image repository 100. Some of these images will not have compositional features available, but many of the images may. Those images lacking identifiable compositional features can be treated as having infinite compositional distances and can therefore be discarded 1010 from the calculation. As a result, a plurality of other images should have compositional distances falling below or equal to the compositional comparison threshold value. The method includes obtaining 1012 at least one tag from at least one of the remaining other image. In an aspect of the present disclosure, the tags are assigned 1014 probability weightings as a function their occurrence frequency in the set of remaining other images and their corresponding compositional distances 1010. The method includes determining 1016 a set of candidate tags and their associated probabilities. Depending on the sparsity of images stored on the social network server 80 image repository 100, the number of candidate tags produced may be zero, one, or a plurality.

FIG. 11 illustrates a flowchart of an example method 1100 for implementing a tag recommender based on the use of event proximity information according to an aspect of the present disclosure. As described in the example of FIG. 5, the event distances between a current image and a plurality of other images may be stored at a social network server 80 image repository 100 is obtained. The method may include obtaining 1102 event distance between a current image and a plurality of other images as a function of capture time and capture geographic location. A geographical distance comparison threshold value is obtained 1104, and compared against the event distances to discard 1106 all images where event distance is greater than the comparison threshold value. The plurality of other images for which the event distance is greater than the event comparison threshold value is discarded 1106. The event comparison threshold value is a value that may be predetermined, or may be determined dynamically as the system operates. Assuming that at least one image has an event distance less than or equal to the event comparison threshold value, at least one tag is obtained 1108 from the at least one other image. In an implementation of the present disclosure, the social network server 80 may have many images 102 stored in the image repository 100. Some of these images may not have event features available, but many of the images may. Those images lacking identifiable event features may be treated as having infinite event distances and can therefore be discarded 1106 from the calculation. As a result, a plurality of other images may have event distances falling below or equal to the event comparison threshold value. In an aspect of the present disclosure, the tags are assigned 1110 probability weightings as a function their occurrence frequency in the set of remaining other images and their corresponding event distances. The method includes determining 1112 a set of candidate tags and their associated probabilities 1112. Depending on the sparsity of images stored on the social network server 80 image repository 100, the number of candidate tags produced may be zero, one, or a plurality.

FIG. 12 illustrates a flowchart of an example method 1200 for implementing a tag recommender based on the use of annotation information according to one aspect of the present disclosure. The method includes obtaining 1202 annotations for a current image. The annotations are obtained and commonly occurring words are removed according to inverse document frequency. The inverse document frequency may be determined by counting the number of times a word occurs in a large number of documents. Example common words include, but are not limited to, the words the, of, to, in, a, is, that, be, it, by, are, for, was, as, he, with, on, his, at, which, but, from, has, this, will, one, have, not, were, or, all, their, an, I, there, been, many, more, so, when, had, may, today, who, would, time, we, about, after, dollars, if, my, other, some, them, being, its, no, only, over, very, you, into, most, than, they, day, even, made, out, first, great, must, these, can, days, every, found, general, her, here, last, new, now, people, public, said, since, still, such, through, under, up, war, well, where, while, years, before, between, country, debts, good, him, interest, large, like, make, our, take, upon, and what. These commonly occurring words are not likely good candidates for meaningful image tags. The remaining words are assigned 1204 tag probabilities according to their inverse occurrence frequency. Subsequently, weightings of the remaining words are modified 1206 according to the social distance between the annotation word contributor and the user who posted the image to the social network server 80. The tags weighting is further modified 1208 based on whether the face of the annotation contributor appears in the current image. In another aspect of the present disclosure, the tag weighting is further modified 1210 based on the proximity of the annotation contributor to the location at which the image was captured. The tag weighting may be further modified 1212 based on the social distance between the annotation contributor and the subjects appearing in the current image. The method also includes determining 1214 a set of candidate tags and their associated probabilities.

FIG. 13 illustrates a flowchart of an example method 1300 for implementing a tag recommender based on the use of subject information according to one aspect of the present disclosure. Subject information may include, but is not limited to: images containing the same subject faces present in current image, tags applied to other images containing the subject faces present in current image, user identity information for the identified subject faces present in current image, social graph information for the users identified with subject faces present in current image, user profile information for the users identified with subject faces present in current image, geographical location history of the users identified with subject faces present in current image. Image information may include: subject faces present in the image, location and size of subject faces in the image, tags currently applied to image, tags recommended for the image, tags applied to images in organizational proximity, tags applied to images in temporal proximity, tags applied to images in geographical proximity, tags applied to images in compositional proximity, tags applied to images captured at the same event, annotations applied to the current image, annotations applied to images in proximity. The method may include obtaining a current image 1302, where the image must contain at least one subject face for the recommender to operate. From among the subject faces in the image, a current subject face is selected 1304, and subject information for that subject face is obtained 1306. This function may be repeated for each of the subject faces found in the current image.

This information is processed to determine 1308 a set of candidate tags and corresponding probabilities. The processing may take a number of different forms. Candidate tags may be obtained from other images containing subject faces in common with the current image. These candidate tags may be weighted according to the subject information and image information listed above. For example, the candidate tags obtained from other images may be weighted according to, but not limited to: social distance between the image owner and the subject face, social distance between current image owner and the owner of the other image containing the subject face in common, size and location of subject face in current image, number of subject faces in common between current image and the other image containing the subject face in common, temporal proximity between current image and the other image containing the subject face in common, geographical proximity between current image and the other image containing the subject face in common, compositional proximity between current image and the other image containing the subject face in common, organizational proximity between current image and the other image containing the subject face in common, information identifying whether the current image was captured at the same event as the other image containing the subject face in common, information identifying whether the current image was captured at the same interest time interval as the other image containing the subject face in common.

FIG. 14 is a block diagram of a user computing device 30 (e.g., one or more user computing devices 30-1 and 30-N of FIG. 1) according to an aspect of the present disclosure. As illustrated, user computing device 30 includes a controller 1404 connected to memory 1406, one or more communications interfaces 1408, one or more user interface components 1410, one or more storage devices 1412, and a location function 1414 by a bus 1402 or similar mechanism. The controller 1404 is a microprocessor, digital ASIC, FPGA, or the like. In this implementation, the controller 1404 is a microprocessor, and the control system 32 is implemented in software and stored in the memory 1406 for execution by the controller 1404. The location module 1414 is a hardware component such as, for example, a GPS receiver. The communications interface 1408 is a wireless communication interface that communicatively couples user computing device 30 to a network, such as network 20 shown in FIG. 1. For example, the communications interface 1408 may be a local wireless interface such as a wireless interface operating according to one of the suite of IEEE 802.11 standards, bluetooth, or the like. The one or more user interface components 1410 include, for example, a touchscreen, a display, one or more user input components (e.g., a keypad), a speaker, or the like, or any combination thereof. The storage device(s) 1412 is a non-volatile memory used to store the image repository 100 and the like.

FIG. 15 is a block diagram of a social network server 80 according to an implementation of the present disclosure. As illustrated, social network server 80 includes a controller 1544 connected to a memory 1546, one or more secondary storage devices 1530, and one or more communications interfaces 1528 by a bus 1522 or similar mechanism. The controller 1524 is a microprocessor, digital Application Specific Integrated Circuit ASIC, Field Programmable Gate Array FPGA, or the like. In this implementation, the controller 1524 is a microprocessor, and the control system 40 is implemented in software and stored in the memory 1526 for execution by the controller 1524. Further, the user accounts, such as user accounts 70 shown in FIG. 1, may be stored in the one or more secondary storage devices 1530. The secondary storage devices 1530 are digital data storage devices such as, for example, one or more hard disk drives. The communications interface 1528 is a wired or wireless communication interface that communicatively couples the social network server 80 to the network 20 of FIG. 1. For example, the communications interface 1528 may be an Ethernet interface, local wireless interface such as a wireless interface operating according to one of the suite of IEEE 802.11 standards, or the like.

Those skilled in the art will recognize improvements and modifications to the preferred implementations of the present disclosure. All such improvements and modifications are considered within the scope of the concepts disclosed herein.

What is claimed is:

1. A method comprising:
receiving, by a server from a first device of a plurality of devices, a first image;
receiving, by a server from at least one of the plurality of devices, a plurality of annotations, each annotation comprising a multi-word comment associated with the first image;
identifying, by the server, a plurality of tags occurring in the annotations by:
receiving, by the server, information identifying a first word in the plurality of annotations as a current tag for the first image,
identifying, by the server, a target subject face corresponding to a target user in the first image,
receiving, by the server, target subject information, the target subject information comprising target identification information identifying the target user within a social network associated with the plurality of devices, identifying, by the server based on the target subject information, a plurality of second images wherein the target user has been identified as a subject face in each of the plurality of second images, deriving, by the server, a plurality of candidate tags from the plurality of second images, determining, by the server, a plurality of candidate tag probabilities for the plurality of candidate tags derived from the plurality of second images based on a proximity between the first image and each of the plurality of second images, and selecting, by the server as a second word occurring in the plurality of annotations, at least one of the plurality of candidate tags to apply as a recommended tag to the first image based on the candidate tag probabilities;

sending, by the server to a second device of the plurality of devices, the first image to present in a first area of a display of the second device;

sending, by the server to the second device of the plurality of devices, the plurality of annotations to present in a second area of the display of the second device, wherein, the first word in the plurality of annotations is configured to be displayed in a first visual style and applied as a first hyperlink, the second word in the plurality of annotations is configured to be displayed in a second visual style and applied as a second hyperlink, and remaining words in the plurality of annotations, which are neither current tags nor recommended tags, are configured to be displayed in a third visual style distinct from the first visual style and the second visual style;

receiving, by the server from the second device, a first input selection of the first hyperlink;

changing, by the server based on the first input, a first state of the first word from the current tag to one from a group consisting of: a remaining word and a recommended tag;

receiving, by the server from the second device, a second input selection of the second hyperlink; and changing, by the server based on the second input, a second state of the second word from the recommended tag to a current tag.

2. The method of claim 1 wherein the server is a photo-sharing server.

3. The method of claim 1 wherein the server is a social network server.

4. The method of claim 1 further comprising:

receiving, by the server from the first device of the plurality of devices, information indicating a permission setting, the permission setting defining a right of the second device of the plurality of devices to apply the recommended tag based on a social distance between the first device and the second device, and based on the permission setting, determining by the server the second visual style, wherein ones of the plurality of annotations are received from the second device, the first device being associated with a first user and the second device being associated with a second user, the first user and second user separated by the social distance in the social network.

5. The method of claim 4 further comprising:

determining, by the server based on the social distance based permission setting, the second visual style.

6. The method of claim 1 wherein sending the plurality of annotations to present in the second area of the display of the second device further comprises:

configuring for presentation user identity information for each of the plurality of annotations, the user identity information identifying a user associated with a device of the plurality of devices having contributed the respective annotation.

7. The method of claim 6 wherein the user identity information is a user name associated with the user.

8. The method of claim 6 wherein the user identity information is a user image, the user image representing the user.

9. The method of claim 1 further comprising:

receiving, from the first device of the plurality of devices, information indicating a permission setting to be applied to the recommended tag, the permission setting defining a right of the second device of the plurality of devices to apply the recommended tag to the first image.

10. The method of claim 1 wherein at least one of the plurality of annotations is a sentence.

11. The method of claim 1 wherein selecting the second word in the plurality of annotations as the recommended tag further comprises:

determining the plurality of candidate tags based on an analysis of the plurality of annotations;

ranking the plurality of candidate tags based on their inverse occurrence rates;

modifying a candidate tag probability of at least one of the plurality of candidate tags based on at least one factor selected from the group consisting of:

social distance between an annotation contributor and a first user of the first device, size of a subject face of the annotation contributor appearing in the first image, geographical proximity of the annotation contributor to capture location of the first image at time of capture, and social distance between the annotation contributor and one or more subjects appearing in first image.

12. The method of claim 1 wherein selecting the second word in the plurality of annotations as the recommended tag based on proximity further comprises:

determining the proximity based on one or more factors selected from the group consisting of:

organizational proximity, temporal proximity, geographical proximity, compositional proximity, event proximity, and subject face association.

13. The method of claim 1 further comprising:

receiving annotation rights information from the first device of the plurality of devices indicating whom may contribute annotations to the first image, the annotation rights information indicating at least one group of users selected from the group consisting of:

friends of a first user associated with the first device of the plurality of devices, friends of the friends of the first user associated with the first device of the plurality of devices, subjects appearing in the first image, friends of the subjects appearing in the first image, social network users geographically and temporally present at an event where the first image was captured, and friends of social network users geographically and temporally present at an event where the first image was captured.

14. The method of claim 1 further comprising:

storing, in a database associated with the server, the first image and the plurality of second images;

storing, in the database associated with the server, the plurality of annotations;

storing, in the database associated with the server, the recommended tag; and storing, in the database associated with the server, the current tag.

15. The method of claim 1 wherein determining the plurality of candidate tag probabilities for the plurality of candidate tags further comprises:
identifying a target annotation from the plurality of annotations associated with the plurality of second images;
identifying at least one candidate tag of the plurality of candidate tags from the target annotation;
adjusting the at least one candidate tag probability based on an inverse occurrence frequency of the at least one candidate tag; and
adjusting the at least one candidate tag probability based on a social distance between the target user and a user providing the first image from the first device.

16. The method of claim 1 wherein determining the proximity between the first image and each of the plurality of second images comprises:
determining an organizational proximity distance between the first image and each of the plurality of second images, wherein the organizational proximity distance is a function of a number of hops in a hierarchical storage structure between storage locations of the first image and each of the plurality of second images;
receiving an organizational proximity threshold value;
performing a comparison of the organizational proximity distance and the organizational proximity threshold value for each of the plurality of second images; and
based on the comparison, adjusting at least one candidate tag probability of at least one candidate tag.

17. The method of claim 1 wherein determining the proximity between the first image and each of the plurality of second images comprises:
determining a geographical proximity distance between the first image and each of the plurality of second images, wherein the geographical proximity distance is a function of a geographical distance between capture locations of the first image and each of the plurality of second images;
receiving a geographical proximity threshold value;
performing a comparison of the geographical proximity distance and the geographical proximity threshold value for each of the plurality of second images; and
based on the comparison, adjusting at least one candidate tag probability of at least one candidate tag.

18. The method of claim 1 wherein determining the proximity between the first image and each of the plurality of second images comprises:
determining a temporal proximity distance between the first image and each of the plurality of second images, wherein the temporal proximity distance is a function of a temporal distance between capture times of the first image and each of the plurality of second images;
receiving a temporal proximity threshold value;
performing a comparison of the temporal proximity distance and the temporal proximity threshold value for each of the plurality of second images; and
based on the comparison, adjusting at least one candidate tag probability of at least one candidate tag.

19. The method of claim 1 wherein determining the proximity between the first image and each of the plurality of second images comprises:
determining a compositional proximity distance between the first image and each of the plurality of second images, wherein the compositional proximity distance is a function of a number of commonly occurring subject faces between the first image and each of the plurality of second images;
receiving a compositional proximity threshold value;
performing a comparison of the compositional proximity distance and the compositional proximity threshold value for each of the plurality of second images; and
based on the comparison, adjusting at least one candidate tag probability of at least one candidate tag.

20. The method of claim 1 wherein determining the proximity between the first image and each of the plurality of second images comprises:
determining an event proximity distance between the first image and each of the plurality of second images, wherein the event proximity distance is a function of a temporal distance between capture times of the first image and each of the plurality of second images and a geographical distance between capture locations of the first image and each of the plurality of second images;
receiving an event proximity threshold value;
performing a comparison of the event proximity distance and the event proximity threshold value for each of the plurality of second images; and
based on the comparison, adjusting at least one candidate tag probability of at least one candidate tag.

21. The method of claim 1 wherein the first device and the second device are selected from the group consisting of: the same device and two separate devices.

22. A computer program product, the computer program product stored on a non-transitory computer-readable storage medium and including instructions configured to cause a processor to:
receive, by a server from a first device of a plurality of devices, a first image;
receive, by a server from at least one of the plurality of devices, a plurality of annotations, each annotation comprising a multi-word comment associated with the first image;
where in order to identify, by the server, a plurality of tags occurring in the annotations, the processor is further operable to:
receive, by the server, information identifying a first word in the plurality of annotations as a current tag for the first image,
identify, by the server, a target subject face corresponding to a target user in the first image,
receive, by the server, target subject information, the target subject information comprising target identification information identifying the target user within a social network associated with the plurality of devices,
identify, by the server based on the target subject information, a plurality of second images wherein the target user has been identified as a subject face in each of the plurality of second images,
derive, by the server, a plurality of candidate tags from the plurality of second images,
determine, by the server, a plurality of candidate tag probabilities for the plurality of candidate tags derived from the plurality of second images based on a proximity between the first image and each of the plurality of second images, and
select, by the server as a second word occurring in the plurality of annotations, at least one of the plurality of candidate tags to apply as a recommended tag to the first image based on the candidate tag probabilities;

send, by the server to a second device of the plurality of devices, the first image to present in a first area of a display of the second device;
send, by the server to the second device of the plurality of devices, the plurality of annotations to present in a second area of the display of the second device, wherein,
the first word in the plurality of annotations is configured to be displayed in a first visual style and applied as a first hyperlink,
the second word in the plurality of annotations is configured to be displayed in a second visual style and applied as a second hyperlink, and
remaining words in the plurality of annotations, which are neither current tags nor recommended tags, are configured to be displayed in a third visual style distinct from the first visual style and the second visual style;
receive, by the server from the second device, a first input selection of the first hyperlink;
change, by the server based on the first input, a first state of the first word from the current tag to one from a group consisting of: a remaining word and a recommended tag;
receive, by the server from the second device, a second input selection of the second hyperlink; and
change, by the server based on the second input, a second state of the second word from the recommended tag to a current tag.

23. A server comprising:
a communication interface facilitating communication between the server and a plurality of devices;
at least one processor operably in communication with the communication interface; and
memory storing software executable by the at least one processor, whereby the server is operable to:
receive, by a server from a first device of a plurality of devices, a first image;
receive, by a server from at least one of the plurality of devices, a plurality of annotations, each annotation comprising a multi-word comment associated with the first image;
where in order to identify, by the server, a plurality of tags occurring in the annotations, the processor is further operable to:
receive, by the server, information identifying a first word in the plurality of annotations as a current tag for the first image,
identify, by the server, a target subject face corresponding to a target user in the first image,
receive, by the server, target subject information, the target subject information comprising target identification information identifying the target user within a social network associated with the plurality of devices,
identify, by the server based on the target subject information, a plurality of second images wherein the target user has been identified as a subject face in each of the plurality of second images,
derive, by the server, a plurality of candidate tags from the plurality of second images,
determine, by the server, a plurality of candidate tag probabilities for the plurality of candidate tags derived from the plurality of second images based on a proximity between the first image and each of the plurality of second images, and
select, by the server as a second word occurring in the plurality of annotations, at least one of the plurality of candidate tags to apply as a recommended tag to the first image based on the candidate tag probabilities;
send, by the server to a second device of the plurality of devices, the first image to present in a first area of a display of the second device;
send, by the server to the second device of the plurality of devices, the plurality of annotations to present in a second area of the display of the second device, wherein,
the first word in the plurality of annotations is configured to be displayed in a first visual style and applied as a first hyperlink,
the second word in the plurality of annotations is configured to be displayed in a second visual style and applied as a second hyperlink, and
remaining words in the plurality of annotations, which are neither current tags nor recommended tags, are configured to be displayed in a third visual style distinct from the first visual style and the second visual style;
receive, by the server from the second device, a first input selection of the first hyperlink;
change, by the server based on the first input, a first state of the first word from the current tag to one from a group consisting of: a remaining word and a recommended tag;
receive, by the server from the second device, a second input selection of the second hyperlink; and
change, by the server based on the second input, a second state of the second word from the recommended tag to a current tag.

* * * * *